United States Patent
Bayya et al.

(10) Patent No.: US 9,658,105 B2
(45) Date of Patent: May 23, 2017

(54) MULTISPECTRAL IMAGING SYSTEM COMPRISING NEW MULTISPECTRAL OPTICS

(71) Applicants: Shyam S. Bayya, Ashburn, VA (US); Daniel J. Gibson, Cheverly, MD (US); Vinh Q. Nguyen, Fairfax, VA (US); Jasbinder S. Sanghera, Ashburn, VA (US); Jay Vizgaitis, Alexandria, VA (US)

(72) Inventors: Shyam S. Bayya, Ashburn, VA (US); Daniel J. Gibson, Cheverly, MD (US); Vinh Q. Nguyen, Fairfax, VA (US); Jasbinder S. Sanghera, Ashburn, VA (US); Jay Vizgaitis, Alexandria, VA (US)

(73) Assignee: THE UNITED STATES OF AMERICA AS REPRESENTED BY THE SECRETARY OF THE NAVY, Washington, DC (US)

(*) Notice: Subject to any disclaimer, the term of this patent is extended or adjusted under 35 U.S.C. 154(b) by 69 days.

(21) Appl. No.: 14/848,555

(22) Filed: Sep. 9, 2015

(65) Prior Publication Data
US 2016/0069744 A1    Mar. 10, 2016

Related U.S. Application Data

(60) Provisional application No. 62/047,725, filed on Sep. 9, 2014.

(51) Int. Cl.
*G01J 3/28* (2006.01)
*G01J 3/02* (2006.01)

(52) U.S. Cl.
CPC ........... *G01J 3/2823* (2013.01); *G01J 3/0208* (2013.01); *G01J 2003/2826* (2013.01)

(58) Field of Classification Search
CPC . G01J 2003/2826; G01J 3/2823; G01J 3/0208
USPC ........................................................ 250/339.1
See application file for complete search history.

(56) References Cited

U.S. PATENT DOCUMENTS

| | | | | |
|---|---|---|---|---|
| 5,781,336 A * | 7/1998 | Coon | .................... | G02B 13/146 359/350 |
| 6,870,690 B1 * | 3/2005 | Lawson | .................... | G02B 3/10 359/721 |
| 8,902,498 B2 * | 12/2014 | Cook | ...................... | F41A 23/24 359/356 |
| 2003/0231403 A1 * | 12/2003 | Shiga | ...................... | G02B 1/04 359/642 |
| 2007/0127140 A1 * | 6/2007 | Reichel | ................. | C04B 35/486 359/754 |

(Continued)

*Primary Examiner* — David J Makiya
*Assistant Examiner* — Taeho Jo
(74) *Attorney, Agent, or Firm* — US Naval Research Laboratory; Rebecca L. Forman

(57) ABSTRACT

A compact multispectral imaging system comprising a set of optical elements capable of simultaneously focusing light from one or more spectral bands (SWIR, MWIR, and LWIR) to a common focal plane and a detector capable of capturing the multispectral image, wherein the optical elements comprise optics made from new optical materials or in combination with existing optical materials that transmit in multispectral wavelength regions.

2 Claims, 13 Drawing Sheets

(56) References Cited

U.S. PATENT DOCUMENTS

| | | | |
|---|---|---|---|
| 2007/0291378 A1* | 12/2007 | Kron | C04B 35/01 359/784 |
| 2011/0228383 A1* | 9/2011 | Cook | F41A 23/24 359/356 |
| 2013/0076900 A1* | 3/2013 | Mrozek | G02B 13/14 348/144 |
| 2013/0278999 A1* | 10/2013 | Carlie | C03C 3/32 359/356 |
| 2014/0268315 A1* | 9/2014 | Carlie | G02B 13/14 359/356 |

* cited by examiner

MULTISPECTRAL IMAGING SYSTEM COMPRISING NEW MULTISPECTRAL OPTICS

PRIORITY CLAIM

The present application is a non-provisional application claiming the benefit of U.S. Provisional Application No. 62/047,725, filed on Sep. 9, 2014 by Shyam S. Bayya et al., entitled "Multispectral Imaging System Comprising New Multispectral Optics," the entire contents of which is incorporated herein by reference.

BACKGROUND

Field of the Invention

The present invention relates to multispectral imaging using optical elements capable of simultaneously focusing light from one or more spectral bands to a common focal plane and a detector capable of capturing the multispectral image.

Description of the Prior Art

Imaging in several spectral bands is used for surveillance and reconnaissance. Some of the examples include imaging in day and night by soldiers for situational awareness on a battlefield, aerial reconnaissance or surveillance over land for border protection, at sea for platform protection, or for property protection. Each spectral band provides unique information depending on the weather conditions and the intensity of solar light. The visible imagers operate between the wavelengths ($\lambda$) of about 0.4 µm to 0.7 µm and provide very high-resolution imagery in clear daylight; however, the imagery is very limited on a hazy day with significantly reduced resolution and range. A shortwave infrared (SWIR) imager operating in the wavelength of about 0.9 µm to about 2 µm has very good haze penetration and can see clearly when the visible camera fails to produce any meaningful information. A midwave infrared (MWIR) thermal imager operating in about 3 µm to about 5 µm wavelength can be used in conjunction with the visible imager for hot object discrimination. For example, a visible imager cannot tell which car in a parking lot or which boat on a pier is running, while a MWIR imager can discriminate the hot engine of a running car or boat from nearby cold engines. A longwave infrared (LWIR) imager operating in the wavelength range of 8 µm-12 µm or 8 µm-14 µm is also used to produce images at day and night. It can image through smoke when other imagers cannot. It is also sensitive to very small temperature differences between an object and its surroundings for target identification in the dark.

Often, imaging in a single band is not enough for positive target identification for the reasons described above. Multispectral imagers based on reflective optics are available. However, these imagers are typically bulky and have a very narrow field of view. They also run into central obscuration due to a secondary mirror. Applications such as wide area surveillance require very wide field of view that can only be achieved through refractive optics. Currently, multispectral imaging using refractive optics is performed with separate cameras with separate apertures, optical trains, and sensors for individual spectral bands. The imaging data obtained can be analyzed separately but is often combined or stitched into a composite multispectral image. Compact, lightweight multispectral imagers using a common aperture would provide practical advantages. Recent developments in multispectral detector technology (Rogalski, "Infrared Detectors for the Future," Acta. Phys. Pol. A, 116(3), 389-406 (2009); Reibel et al., "Infrared Dual Band detectors for next generation," Proc. of SPIE 8012, 801238 (2011); and Dixon et al., "Dual-Band Technology on Indium Gallium Arsenide Focal Plane Arrays," Proc. of SPIE 8012, 80121V (2011)) and common focal plane arrays (FPA) can potentially enable compact imagers but are limited by developments in multispectral refractive optics. Currently there are very few optical materials commercially available that cover the transmission range from SWIR to LWIR. These materials also cover a very narrow region in the map of refractive index and dispersion. Thus, several optical elements are needed to correct for chromatic aberrations over a broad wavelength spectrum (U.S. Pat. No. 7,369,303 to Tejada (2008) and Sparrold et al., "Refractive Lens Design for Simultaneous SWIR and LWIR Imaging," SPIE Proceedings Vol. 8012, 801224 (2011)) adding size and excessive weight to the imaging system. For example, an F/1, 50 mm SWIR/LWIR imager described by Sparrold et. al (Sparrold et al., "Refractive Lens Design for Simultaneous SWIR and LWIR Imaging," SPIE Proceedings Vol. 8012, 801224 (2011)) required eleven optical elements for correction of chromatic aberrations over both of the wavelength bands (0.9-1.7 µm and 8-10 µm) and correction of other optical aberrations to meet the required performance specification (23° full field of view, 30% contrast at 20 line pairs per mm). Such an imager will be very heavy and it will be challenging to meet tolerances due to the alignment of all eleven elements and optical distortion in a useful temperature range of −50° C. to 50° C. due to the difference in the thermo-optic coefficient (dn/dT) of the individual elements. In addition, there are 22 optical surfaces requiring broadband AR coatings.

There have been several dual-band optical designs and multispectral imagers based on refractive optics in SWIR+MWIR or MWIR+LWIR or SWIR+LWIR imagers in recent years, but all use optics from a handful of materials which have a broad spectral transmission covering all the wavelengths of interest (U.S. Pat. No. 7,369,303 to Tejada (2008); Sparrold et al., "Refractive Lens Design for Simultaneous SWIR and LWIR Imaging," SPIE Proceedings Vol. 8012, 801224 (2011); and Palmer et al., "SOMEWHERE UNDER THE RAINBOW: The Visible to Far Infrared Imaging Lens", SPIE Proceedings Vol. 8012, 801223 (2011)). The limited number of optical materials to choose from leads to complex lens systems with either poor imaging performance or excessive size and weight due to the use of a large number of optical elements needed to meet the specifications of required image quality. Use of a large number of optical elements also makes the alignment tolerances very challenging. Another drawback of using an imaging system with a large number of optical elements is the large number of air-optic interfaces resulting in Fresnel reflection loss per surface (R) given by the relation:

$$R=[(n-1)/(n+1)]^2$$

where n is the refractive index of the optic at a given wavelength. These Fresnel reflection losses multiply with increasing number of air/optic interfaces from the increased number of optical elements and reduce the overall brightness of the image. An imager that produces comparable imaging performance with fewer optical elements and fewer air/optic interfaces will have smaller size, lower weight and will produce an image with higher brightness.

An imaging system's performance is measured and reported in terms of its Modulation Transfer Function (MTF), which describes the contrast of the image relative to that of the object and is plotted as a function of resolution (spatial frequency) in line-pairs per millimeter (lp/mm). Diffraction fundamentally limits the maximum attainable MTF of an imaging system. Imagers with resolutions as good as this theoretical limit are not uncommon and are said to be diffraction limited.

One challenge in designing and building a multispectral imager with reduced size, weight and improved performance, is reducing the weight of the imaging optics, since the focal plane array (FPA) sensors are becoming more capable and more compact. This includes reducing the number of optical elements and number of air/optic interfaces while meeting the imaging system performance requirements. Clearly, there is a need to increase the number of available broadband multispectral optical materials that can be used in lightweight and compact multispectral imaging solutions. The "glass map" is relied on for optical material selection while designing optics. A glass map displays various optical materials (including single crystals, polycrystalline ceramics and amorphous glasses) on a refractive index versus Abbe number plot. The Abbe number in the IR region is defined as:

$$\text{Abbé Number}, v = \frac{n_{center} - 1}{n_{short} - n_{long}}$$

where $n_{short}$ and $n_{long}$ are the indices at the extreme ends of the wavelength range and $n_{center}$ is the index at center wavelength (e.g. for LWIR $n_{short}$=index at 8 μm, $n_{long}$=index at 12 μm, and $n_{center}$=index at 10 μm). The short and long wavelengths may vary depending on the application, FPA sensor, and design criteria. A low Abbe number represents high dispersion. FIG. 1 shows a glass map (Abbe diagram) for visible glasses only. The map shows a large selection of materials for optics design in the visible region. When designing achromatic doublets to do color correction over a wider wavelength range, optics design engineers use the first optical element (crown) with positive power and high index but low dispersion for focusing power with minimal chromatic aberration. The second element (flint) with negative power is chosen to have low refractive index but a high dispersion to correct for chromatic aberration with minimal reduction in focusing power. The glass map narrows in SWIR with not as many possibilities as in the visible. However, the choice becomes very limited for MWIR and LWIR with only a handful of optical materials.

SUMMARY

The present invention provides a compact multispectral imaging system comprising a set of refractive optical elements capable of simultaneously focusing light from one or more spectral bands (SWIR, MWIR, and LWIR) to a common focal plane and a detector capable of capturing the multispectral image. The refractive optical elements in the multispectral imager comprise new optical materials disclosed herein or in combination with existing optical materials that transmit in multispectral wavelength regions. This invention provides multispectral imaging capability using fewer optical elements and reduced number of air/glass interfaces, which reduces the size and weight of the imager, eases the tolerance requirements, reduces cost, and improves optical performance compared to using only existing commercially available materials. This invention also provides new refractive optical materials populating the glass map and expanding choices for multispectral optics in SWIR, MWIR, and LWIR. The new optical materials disclosed herein, in general, have negative or very low do/dT, making it easier to athermalize the imaging system. All the NRL-1 through NRL-13 glasses have similar softening behavior (comparable glass transition temperature) and matched thermal expansion (CTE) which will allow co-molding of these glasses at a common temperature to form layered optics. These glasses offer an additional advantage of forming bonded IR doublets without the use of optical cements. This simplifies alignment tolerances and also reduces Fresnel reflection losses with fewer air/glass interfaces. Multiple designs show the benefit of expanding the glass map for infrared materials. The largest impact is in systems that have more challenging requirements. The harder the lens designs are pushed due to smaller pixels, larger FPA sizes, broader spectral bands, the more limited one becomes by the traditional materials and optics. Further design improvements can be achieved by utilizing the best combinations of all materials (MILTRAN ceramics, NRL's IR glasses, and currently available crystalline and amorphous materials).

The optical elements of the current invention will replace existing elements in infrared optical system designs with a size, weight and performance advantage. The alternatives to the current invention are already in use in the form of many-element IR imaging lenses, often with separate apertures, optical trains, and sensors for individual spectral bands making them very complex, large, and bulky.

These and other features and advantages of the invention, as well as the invention itself, will become better understood by reference to the following detailed description, appended claims, and accompanying drawings.

BRIEF DESCRIPTION OF THE DRAWINGS

FIG. 5 shows the dispersion in new optical materials of this disclosure (squares) and traditional materials (diamonds) in SWIR, MWIR and LWIR wavelength region.

DETAILED DESCRIPTION

Figure 1:
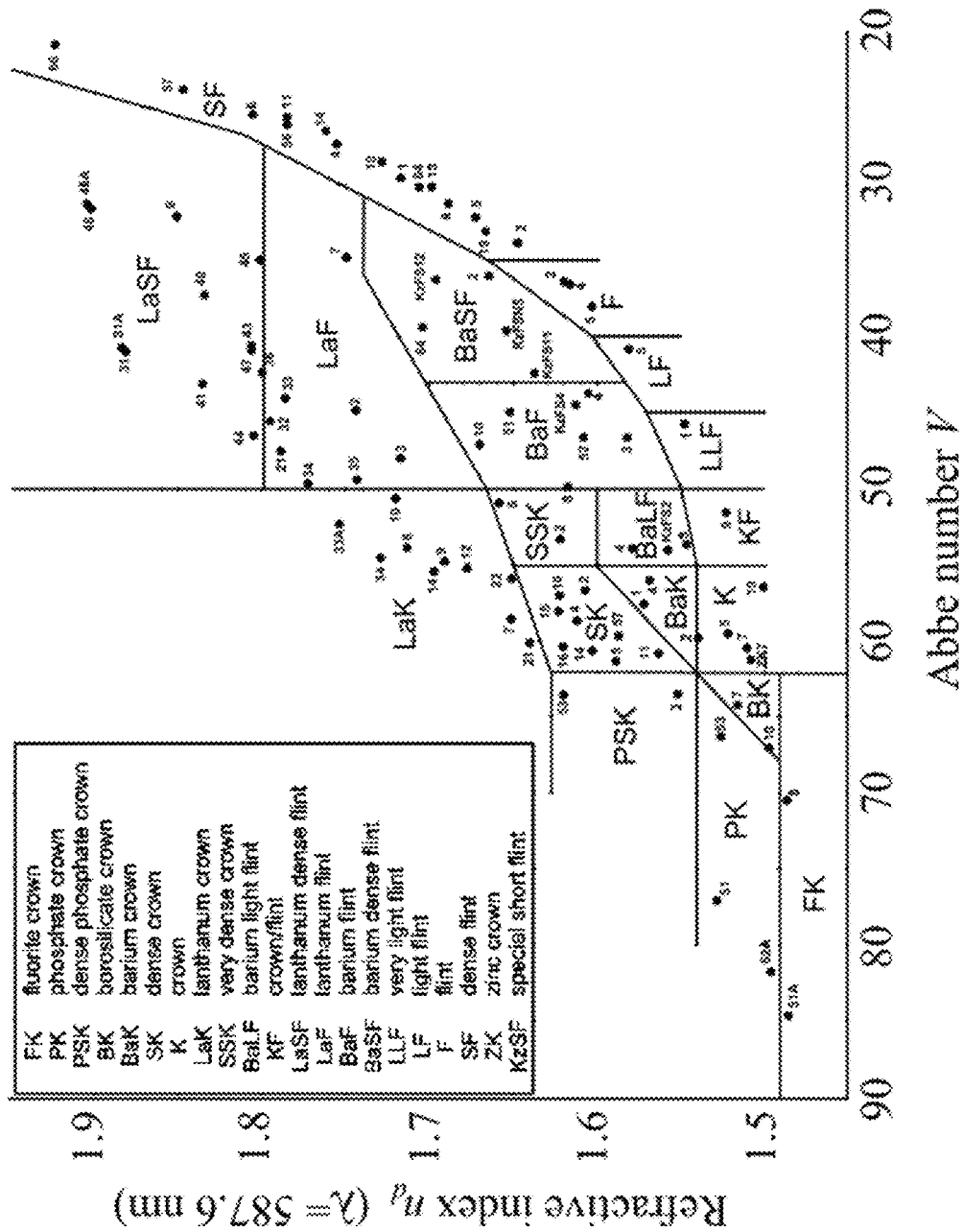
FIG. 1 is an Abbe diagram for glasses in the visible wavelength region.
Figure 2:
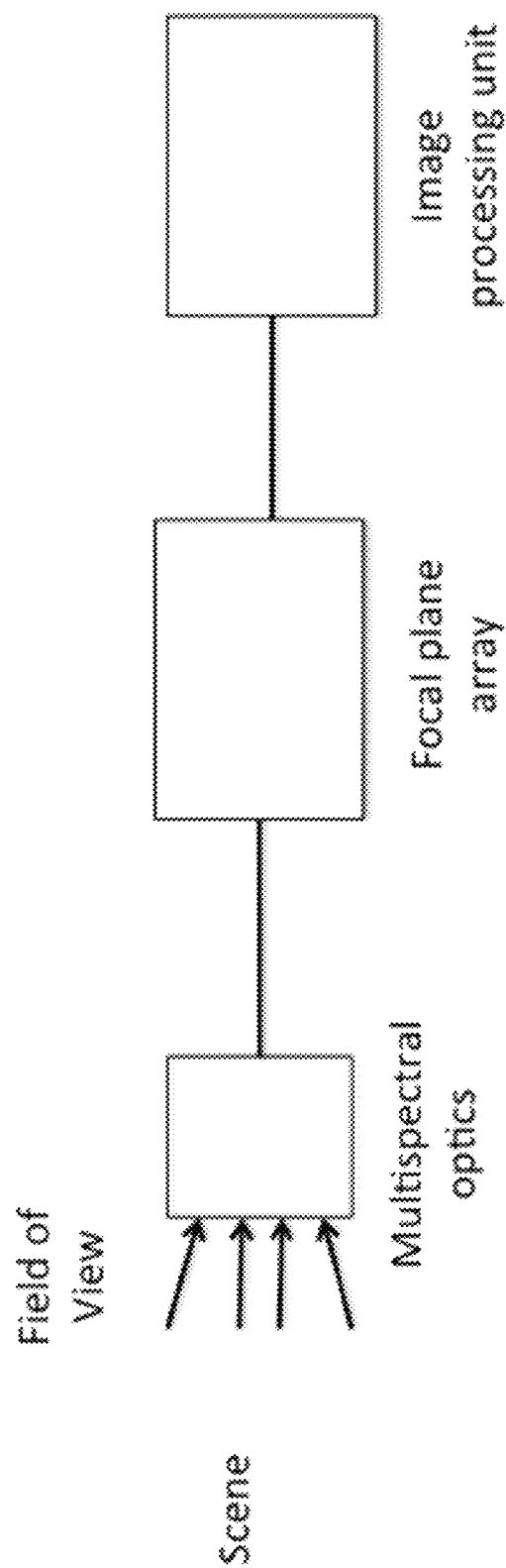
FIG. 2 is a diagram of a multispectral imager.

The present invention provides a compact multispectral imaging system comprising a set of refractive optical elements capable of simultaneously focusing light from one or more spectral bands (SWIR, MWIR, and LWIR) to a common focal plane and a detector capable of capturing the multispectral image. The set of refractive optical elements in the multispectral imager comprises individual refractive optical elements wherein at least one such refractive optical element comprises an optical material chosen from a set of new multispectral optical materials disclosed herein (MILTRAN ceramic and NRL-1 through NRL-13 glasses). The set of refractive optical elements in the multispectral imager may also include refractive optical elements comprising existing multispectral optical materials. The components of a multispectral imager are shown in FIG. 2. A scene is captured at a field of view by the multispectral optics. The multispectral optics capture the light radiation from the scene in SWIR, MWIR and LWIR wavelength ranges and focus the multispectral image on a common image plane. The focal plane array detector, capable of detecting the optical wavelength ranges of interest, is placed at this image plane. An image-processing unit processes the signals from the Focal Plane Array to generate an image of the scene in each wavelength region. Fourteen new multispectral refractive optical materials are disclosed herein. These materials transmit in SWIR, MWIR and LWIR wavelength regions and fill up the glass map with more material selections enabling MWIR, LWIR and multiband achromats. The properties of these new optical materials are defined herein and shown on glass maps for SWIR, MWIR and LWIR. Some exemplary multispectral imager designs using the new materials are shown and their performance is compared to similar designs using currently available materials.

A multispectral imager where the multispectral optics are made only from the existing optical materials does not meet the diffraction limited performance at all or meets the diffraction limited performance with a large number of optical elements adding excessive size and weight to the imager. It also increases the required tolerances for alignment and reduces image brightness from greater Fresnel reflection losses. In one embodiment of this invention, all the optical elements in a multi-spectral imager use only optics selected from the new NRL optical materials disclosed herein. In another embodiment, all the optical elements in a multi-spectral imager use a combination of optics selected from the new NRL optical materials and existing crystalline and/or amorphous materials currently available. In yet another embodiment, the imaging systems are designed for single waveband (SWIR or MWIR or LWIR) comprising only optics selected from the new NRL materials disclosed herein or their combination with currently available crystalline and/or amorphous optical materials. Some exemplary multispectral imager designs using the new NRL materials of this disclosure are shown and their performance compared to optical designs made to similar specifications using currently available crystalline materials.

The new NRL optical materials are individually defined in Table 1 by a subset of the following optical and physical characteristics: the −3 dB short and long wavelength transmission edges (defined as the wavelengths where optical transmission falls to 50% of maximum and is not corrected for Fresnel surface reflection losses), the refractive index at one or more wavelengths, the thermo-optic coefficient (dn/dT) at one or more wavelengths, the SWIR Abbe number ($V_{SWIR}$, where $\lambda_{short}=0.9$ μm and $\lambda_{long}=2.0$ μm), the MWIR Abbe number ($V_{MWIR}$, where $\lambda_{short}=3.0$ μm and $\lambda_{long}=5.0$ μm), the LWIR Abbe number ($V_{LWIR}$, where $\lambda_{short}=8.0$ μm and $\lambda_{long}=12.0$ μm), the coefficient of thermal expansion (CTE), the glass transition temperature (Tg), the viscosity and the constituent chemical elements.

TABLE 1

Properties of traditional and new materials

| Glass | n | Abbe Number V(0.9-1.7) | V(3-5) | V(8-12) | dn/dT ($\times 10^{-6}$)/C. | Density (g/cm$^3$) | CTE ($\times 10^{-6}$)/C. |
|---|---|---|---|---|---|---|---|
| Old Materials | | | | | | | |
| Ge | 4.02495 | | 108 | 785 | 400.0 | 5.35 | 6.1 |
| M-ZnS (CLEARTRAN) | 2.25223 | 39 | 113 | 23 | 38.7 | 4.08 | 6.8 |
| ZnSe | 2.43316 | 29 | 178 | 57 | 63.0 | 5.42 | 7.0 |
| BaF2 | 1.45670 | 1.23 | 45 | 7 | −15.2 | 4.89 | 18.1 |
| CdTe | 2.68831 | 15 | 165 | 156 | 50.0 | 5.85 | 5.9 |
| NRL Materials | | | | | | | |
| MILTRAN | 2.49036 | 31 | 93 | 20 | 23.5 | 4.50 | 15.0 |
| NRL-1 | 2.39908 | 23 | 162 | 48 | −18.0 | 3.21 | 26.6 |
| NRL-2 | 2.70669 | 15 | 175 | 142 | 36.5 | 4.55 | 23.2 |
| NRL-3 | 2.39893 | 22 | 160 | 48 | −6.0 | 3.27 | 25.6 |
| NRL-4 | 2.64846 | 16 | 201 | 235 | −19.2 | 4.48 | 30.2 |
| NRL-5 | 2.47755 | 19 | 200 | 127 | 6.9 | 4.42 | 26.0 |
| NRL-6 | 3.17170 | | 111 | 258 | 164.0 | 5.23 | 18.3 |
| NRL-7 | 2.38655 | 24 | 161 | 47 | −7.8 | 3.18 | 25.3 |
| NRL-8 | 2.66326 | 15 | 189 | 185 | 0.3 | 4.52 | 25.7 |
| NRL-9 | 2.41728 | 23 | 162 | 50 | −4.9 | 3.28 | 25.1 |
| NRL-10 | 2.52624 | 18 | 195 | 134 | 21.5 | 4.45 | 27.0 |
| NRL-11 | 2.42937 | 23 | 164 | 52 | −3.4 | 3.28 | 25.5 |
| NRL-12 | 2.45830 | 21 | 165 | 56 | 0.5 | 3.40 | 25.9 |
| NRL-13 | 2.49002 | 21 | 166 | 60 | 1.9 | 3.54 | 25.2 |

Note:
NRL-6 does not transmit over the entire SWIR band.

MILTRAN Ceramics

Figure 3:
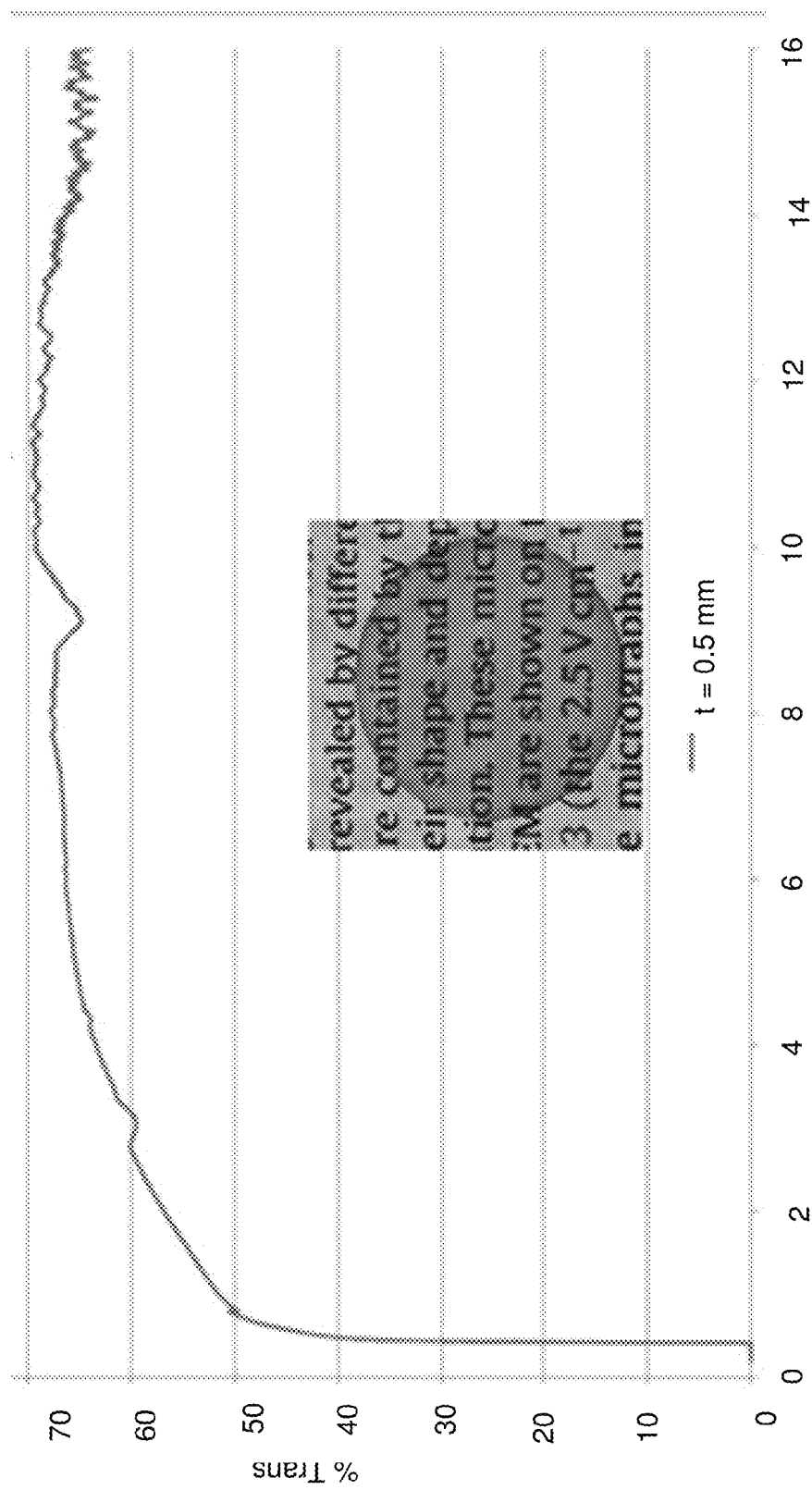
FIG. 3 shows visible and broadband IR transmission of a MILTRAN Ceramic.

MILTRAN is a polycrystalline sulfide based ceramic made from a Group 2 element (e.g. Mg, Ca, Sr or their mixtures), a lanthanide (e.g. La, Gd or their mixtures) and sulfur. The composition can be slightly modified with the addition of Na or Cd without significantly changing the overall optical properties. MILTRAN ceramics can be fabricated in many different ways. One such method is of dry press-sinter-HIP (hot iso statically pressed). In this process, the starting sulfide powders are dry pressed in the desired shape at pressures of typically 1,400-7,000 psi and more typically at pressures of 2,800-4,200 psi. The dry pressed discs could be additionally compacted in a cold isostatic press at a pressure of 10,000-50,000 psi. The dry pressed/compacted disc is sintered in an atmosphere controlled furnace in a temperature range of 1200° C. to 1500° C. for a period of typically 1-72 hours and more typically 12-48 hours. The furnace atmosphere during sintering could be inert (nitrogen, argon or helium) or $H_2S$ gas or mixtures thereof. The sintered ceramic can then be hot isostatically pressed (HIP) in argon atmosphere in the temperature range of 1200° C. to 1500° C. and a pressure range of 7,000 psi-50,000 psi. for a period of 10 minutes to 6 hours. Another method for the fabrication of MILTRAN ceramic could be hot pressing and hot isostatic pressing. In this method the starting powder is loaded in a graphite die and hot pressed at about 900-1300° C. using a pressure of 1,000-10,000 psi for a period of 1 minute to 6 hours. The atmosphere during the hot press is typically vacuum and can be controlled between $10^{-2}$ to $10^{-5}$ torr. The hot pressed sample could then be hot isostatically pressed under the conditions described above. FIG. 3 shows the clarity and broadband IR transmission of a MILTRAN ceramic. In one embodiment, it is defined by an optical material having >65% transmission in SWIR, MWIR and LWIR wavelength regions (predominantly limited by Fresnel reflection losses); a refractive index of about 2.49 at a wavelength of 3 µm; a SWIR Abbe number ($V_{SWIR}$) of about 31; a MWIR Abbe number ($V_{MWIR}$) of about 93; a LWIR Abbe number ($W_{LWIR}$) of about 20; and a coefficient of thermal expansion (CTE) of about $15 \times 10^{-6}/°$ C. MILTRAN composition variations are possible as long as the overall optical and thermal properties of the material are typically within ±5% and more typically within ±1% of the values reported above.

NRL Glasses

Figure 4:
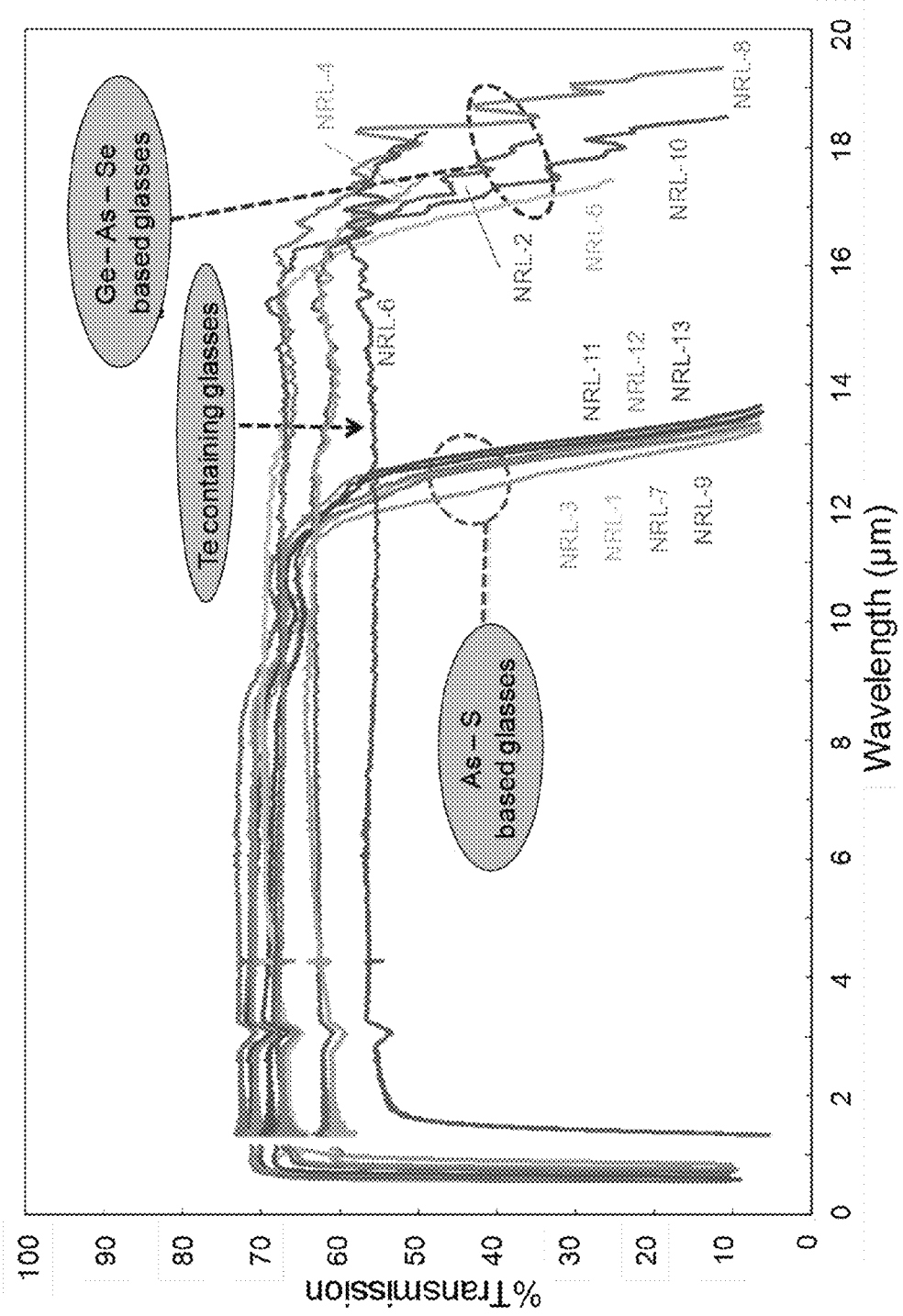
FIG. 4 shows broadband IR transmission of IR glass.

Thirteen new glasses (NRL-1 through NRL-13) are disclosed herein. These glasses are based on sulfides, selenides and tellurides and their mixtures. All NRL glasses are made from pure elements selected from the group of Ge, As, S, Se, and Te as major constituents. The pure elements are batched and sealed in a fused silica ampoule under vacuum in the range of $10^{-3}$ to $10^{-6}$ torr. The batch is typically melted at 700-950° C. for 1 to 48 hours and more typically 10 to 16 hours. The glass melt could be agitated by the action of rocking and/or rotating, or stirring, or some other suitable means, to facilitate homogenization. The melt is then cooled down to about 220 to 500° C. range and more typically to 250-350° C. range. The ampoule is removed from the furnace and quenched in air or in water for 5-30 seconds and then placed in an annealer near the glass transition temperatures. After annealing for typically 10-20 hours the annealing furnace is slowly cooled to room temperature. All glasses have good refractive index homogeneity, optical clarity and broadband IR transmission. The transmission windows of these glasses are shown in FIG. 4. The transmission window is defined by the visible/near IR wavelength edge (or electronic edge) and LWIR wavelength edge (or multi-phonon edge) whose wavelengths are determined by identifying the wavelengths at which 50% of maximum transmission is achieved, also called the −3 dB short wavelength edge and −3 dB long wavelength edge. The maximum transmission is limited by Fresnel reflection losses based on the refractive index. The reflection losses can be minimized with the application of antireflective coatings or forming motheye or anti-reflective surface structures (ARSS). Their index and dispersion profile can be tailored by compositional modifications over a wide range. The refractive indices of NRL glasses (1-13) range from 2.38 to 3.17 and fill up the SWIR, MWIR and LWIR glass maps. Except for NRL-6 glass, all NRL materials transmit in SWIR, MWIR and LWIR region. NRL-6 glass only has partial transmission in the SWIR band. All the NRL-1 through NRL-13 glasses are designed to have similar softening behavior (comparable glass transition temperatures, with the typical difference being less than 20° C., and more typically less than 10° C.) to allow co-molding of these glasses at a common temperature to form layered or bonded optics without the need for optical cements. These glasses are further defined by their properties below.

NRL-1 Glass

This glass is defined by an optical glass material having transmission in SWIR, MWIR and LWIR wavelength regions with a −3 dB electronic edge at about 0.56 µm and a −3 dB multiphonon edge at about 12.7 µm; a refractive index of about 2.40 at a wavelength of 3 µm; a $V_{SWIR}$ of about 23; a $V_{MWIR}$ of about 162; a $V_{LWIR}$ of about 48; a thermo-optic coefficient (dn/dT) of about $-17 \times 10^{-6}/°$ C. at a wavelength of 3 µm; a glass transition temperature ($T_g$) of about 195° C.; a viscosity of about $10^{8.4}$ Pa·S at 240° C. and a coefficient of thermal expansion (CTE) of about $26.6 \times 10^{-6}/°$ C. An example of such a glass is made from Arsenic (As) and Sulfur (S). Other components, such as Ge, Ga, Sb, Se, Te can be added in minor amounts as long as the overall optical and thermal properties of the material are typically within ±5% and more typically within ±1% of the values reported above.

NRL-2 Glass

This glass is defined by an optical glass material having transmission in SWIR, MWIR and LWIR wavelength regions with a −3 dB electronic edge at about 0.79 µm and a −3 dB multiphonon edge at about 18.2 µm; a refractive index of about 2.71 at a wavelength of 3 µm; a $V_{SWIR}$ of about 15; a $V_{MWIR}$ of about 175; a $V_{LWIR}$ of about 142; a thermo-optic coefficient (dn/dT) of about $39 \times 10^{-6}/°$ C. at a wavelength of 3 µm; a glass transition temperature ($T_g$) of about 196° C.; a viscosity of about $10^{8.7}$ Pa·S at 240° C. and a coefficient of thermal expansion (CTE) of about $23.2 \times 10^{-6}/°$ C. An example of such a glass is made from Ge—As—Se. Other components, such as Ga, Sb, S, and Te can be added in minor amounts as long as the overall optical and thermal properties of the material are typically within ±5% and more typically within ±1% of the values reported above.

NRL-3 Glass

This glass is defined by an optical glass material having transmission in SWIR, MWIR and LWIR wavelength regions with a −3 dB electronic edge at about 0.89 µm and a −3 dB multiphonon edge at about 12.5 µm; a refractive index of about 2.40 at a wavelength of 3 µm; a $V_{SWIR}$ of about 22; a $V_{MWIR}$ of about 160; a $V_{LWIR}$ of about 48; a thermo-optic coefficient (dn/dT) of about $-5.9 \times 10^{-6}/°$ C. at a wavelength of 3 µm; a glass transition temperature ($T_g$) of about 196° C.; a viscosity of about $10^{8.8}$ Pa·S at 240° C. and a coefficient of thermal expansion (CTE) of about $25.6 \times 10^{-6}/°$ C. An example of such a glass is made from Ge—As—S—Te. Other components, such as Ga, Sb, and Se can be added in minor amounts as long as the overall optical and thermal properties of the material are typically within ±5% and more typically within ±1% of the values reported above.

NRL-4 Glass

This glass is defined by an optical glass material having transmission in SWIR, MWIR and LWIR wavelength regions with a −3 dB electronic edge at about 0.78 μm and a −3 dB multiphonon edge at about 17.5 μm; a refractive index of about 2.65 at a wavelength of 3 μm; a $V_{SWIR}$ of about 16; a $V_{MWIR}$ of about 201; a $V_{LWIR}$ of about 235; a thermo-optic coefficient (dn/dT) of about −18.4×10$^{-6}$/° C. at a wavelength of 3 μm; a glass transition temperature ($T_g$) of about 201; a viscosity of about 10$^{10.1}$ Pa·S at 240° C. and a coefficient of thermal expansion (CTE) of about 30.2×10$^6$/° C. An example of such a glass is made from Ge—As—Se. Other components, such as Ga, Sb, S, and Te can be added in minor amounts as long as the overall optical and thermal properties of the material are typically within ±5% and more typically within ±1% of the values reported above.

NRL-5 Glass

This glass is defined by an optical glass material having transmission in SWIR, MWIR and LWIR wavelength regions with a −3 dB electronic edge at about 0.74 μm and a −3 dB multiphonon edge at about 17.2 μm; a refractive index of about 2.48 at a wavelength of 3 μm; a $V_{SWIR}$ of about 19; a $V_{MWIR}$ of about 200; a $V_{LWIR}$ of about 127; a thermo-optic coefficient (dn/dT) of about 8.3×10$^{-6}$/° C. at a wavelength of 3 μm; a glass transition temperature ($T_g$) of about 192; a viscosity of about 10$^{9.7}$ Pa·S at 240° C. and a coefficient of thermal expansion (CTE) of about 26×10$^{-6}$/° C. An example of such a glass is made from Ge—As—Se. Other components, such as Ga, Sb, S, and Te can be added in minor amounts as long as the overall optical and thermal properties of the material are typically within ±5% and more typically within ±1% of the values reported above.

NRL-6 Glass

This glass is defined by an optical glass material having transmission in MWIR and LWIR wavelength regions with a −3 dB electronic edge at about 1.43 μm and a −3 dB multiphonon edge at about 18.2 μm; a refractive index of about 3.18 at a wavelength of 3 μm; a $V_{MWIR}$ of about 111; a $V_{LWIR}$ of about 258; a thermo-optic coefficient (dn/dT) of about 177×10$^{-6}$/° C. at a wavelength of 3 μm; a glass transition temperature ($T_g$) of about 191; a viscosity of about 10$^{8.7}$ Pa·S at 240° C. and a coefficient of thermal expansion (CTE) of about 18.3×10$^{-6}$/° C. An example of such a glass is made from Ge—As—Se—Te. Other components, such as Ga, Sb, and S can be added in minor amounts as long as the overall optical and thermal properties of the material are typically within ±5% and more typically within ±1% of the values reported above.

NRL-7 Glass

This glass is defined by an optical glass material having transmission in SWIR, MWIR and LWIR wavelength regions with a −3 dB electronic edge at about 0.57 μm and a −3 dB multiphonon edge at about 12.7 μm; a refractive index of about 2.39 at a wavelength of 3 μm; a $V_{SWIR}$ of about 24; a $V_{MWIR}$ of about 161; a $V_{LWIR}$ of about 47; a thermo-optic coefficient (dn/dT) of about −6.1×10$^{-6}$/° C. at a wavelength of 3 μm; a glass transition temperature ($T_g$) of about 201; a viscosity of about 10$^{8.7}$ Pa·S at 240° C. and a coefficient of thermal expansion (CTE) of about 25.3×10$^{-6}$/° C. An example of such a glass is made from Ge—As—S. Other components, such as Ga, Sb, Se, and Te can be added in minor amounts as long as the overall optical and thermal properties of the material are typically within ±5% and more typically within ±1% of the values reported above.

NRL-8 Glass

This glass is defined by an optical glass material having transmission in SWIR, MWIR and LWIR wavelength regions with a −3 dB electronic edge at about 0.79 μm and a −3 dB multiphonon edge at about 18.9 μm; a refractive index of about 2.67 at a wavelength of 3 μm; a $V_{SWIR}$ of about 15; a $V_{MWIR}$ of about 189; a $V_{LWIR}$ of about 185; a thermo-optic coefficient (dn/dT) of about 1.5×10$^{-6}$/° C. at a wavelength of 3 μm; a glass transition temperature ($T_g$) of about 193; a viscosity of about 10$^{8.8}$ Pa·S at 240° C. and a coefficient of thermal expansion (CTE) of about 25.7×10$^{-6}$/° C. An example of such a glass is made from Ge—As—Se. Other components, such as Ga, Sb, S, and Te can be added in minor amounts as long as the overall optical and thermal properties of the material are typically within ±5% and more typically within ±1% of the values reported above.

NRL-9 Glass

This glass is defined by an optical glass material having transmission in SWIR, MWIR and LWIR wavelength regions with a −3 dB electronic edge at about 0.61 μm and a −3 dB multiphonon edge at about 12.8 μm; a refractive index of about 2.42 at a wavelength of 3 μm; a $V_{SWIR}$ of about 23; a $V_{MWIR}$ of about 162; a $V_{LWIR}$ of about 50; a thermo-optic coefficient (dn/dT) of about −3.9×10$^{-6}$/° C. at a wavelength of 3 μm; a glass transition temperature ($T_g$) of about 197; a viscosity of about 10$^{8.6}$ Pa·S at 240° C. and a coefficient of thermal expansion (CTE) of about 25.1×10$^{-6}$/° C. An example of such a glass is made from Ge—As—S—Se. Other components, such as Ga, Sb, and Te can be added in minor amounts as long as the overall optical and thermal properties of the material are typically within ±5% and more typically within ±1% of the values reported above.

NRL-10 Glass

This glass is defined by an optical glass material having transmission in SWIR, MWIR and LWIR wavelength regions with a −3 dB electronic edge at about 0.74 μm and a −3 dB multiphonon edge at about 17.5 μm; a refractive index of about 2.53 at a wavelength of 3 μm; a $V_{SWIR}$ of about 18; a $V_{MWIR}$ of about 195; a $V_{LWIR}$ of about 134; a thermo-optic coefficient (dn/dT) of about 23.5×10$^{-6}$/° C. at a wavelength of 3 μm; a glass transition temperature ($T_g$) of about 191; a viscosity of about 10$^{8.9}$ Pa·S at 240° C. and a coefficient of thermal expansion (CTE) of about 27×10$^{-6}$/° C. An example of such a glass is made from Ge—As—Se. Other components, such as Ga, Sb, S, and Te can be added in minor amounts as long as the overall optical and thermal properties of the material are typically within ±5% and more typically within ±1% of the values reported above.

NRL-11 Glass

This glass is defined by an optical glass material having transmission in SWIR, MWIR and LWIR wavelength regions with a −3 dB electronic edge at about 0.62 μm and a −3 dB multiphonon edge at about 12.9 μm; a refractive index of about 2.43 at a wavelength of 3 μm; a $V_{SWIR}$ of about 23; a $V_{MWIR}$ of about 164; a $V_{LWIR}$ of about 52; a thermo-optic coefficient (dn/dT) of about −0.3×10$^{-6}$/° C. at a wavelength of 3 μm; a glass transition temperature ($T_g$) of about 196; a viscosity of about 10$^{8.2}$ Pa·S at 240° C. and a coefficient of thermal expansion (CTE) of about 25.5×10$^{-6}$/° C. An example of such a glass is made from As—S—Se. Other components, such as Ge, Ga, Sb, and Te can be added in minor amounts as long as the overall optical and thermal properties of the material are typically within ±5% and more typically within ±1% of the values reported above.

NRL-12 Glass

This glass is defined by an optical glass material having transmission in SWIR, MWIR and LWIR wavelength regions with a −3 dB electronic edge at about 0.64 μm and a −3 dB multiphonon edge at about 13 μm; a refractive index of about 2.46 at a wavelength of 3 μm; a $V_{SWIR}$ of about 21; a $V_{MWIR}$ of about 165; a $V_{LWIR}$ of about 56; a thermo-optic coefficient (dn/dT) of about $0.8 \times 10^{-6}$/° C. at a wavelength of 3 μm; a glass transition temperature ($T_g$) of about 193; a viscosity of about $10^{8.1}$ Pa·S at 240° C. and a coefficient of thermal expansion (CTE) of about $25.9 \times 10^{-6}$/° C. An example of such a glass is made from As—S—Se. Other components, such as Ge, Ga, Sb, and Te can be added in minor amounts as long as the overall optical and thermal properties of the material are typically within ±5% and more typically within ±1% of the values reported above.

NRL-13 Glass

This glass is defined by an optical glass material having transmission in SWIR, MWIR and LWIR wavelength regions with a −3 dB electronic edge at about 0.66 μm and a −3 dB multiphonon edge at about 13 μm; a refractive index of about 2.49 at a wavelength of 3 μm; a $V_{SWIR}$ of about 21; a $V_{MWIR}$ of about 166; a $V_{LWIR}$ of about 60; a thermo-optic coefficient (dn/dT) of about $1.9 \times 10^{-6}$/° C. at a wavelength of 3 μm; a glass transition temperature ($T_g$) of about 192; a viscosity of about $10^{7.9}$ Pa·S at 240° C. and a coefficient of thermal expansion (CTE) of about $25.2 \times 10^{-6}$/° C. An example of such a glass is made from As—S—Se. Other components, such as Ge, Ga, Sb, and Te can be added in minor amounts as long as the overall optical and thermal properties of the material are typically within ±5% and more typically within ±1% of the values reported above.

All the fourteen new multispectral optical materials identified above are further described by their room temperature dispersion data as listed in Table 2.

The dn/dT values of NRL-1 through NRL-13 glasses with the exception of NRL-6 are either negative or are very low positive, which will be useful in athermalizing optical systems. NRL-6 is a high index glass and has low dispersion in LWIR. However, it has a big advantage over Ge with about 60% lower dn/dT and higher temperature stability.

Figure 5A:
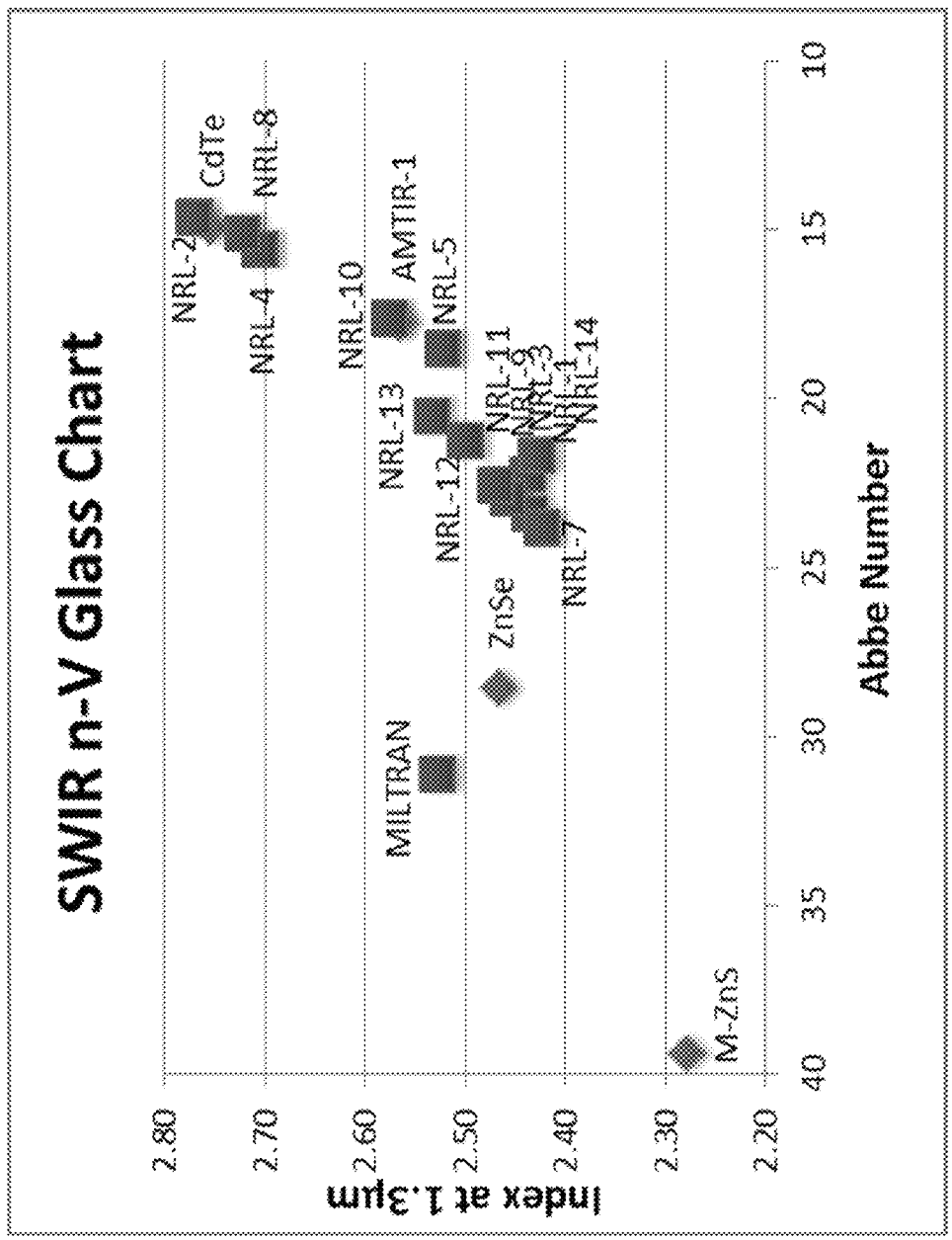
FIG. 5a is for an index at 1.3 μm.
Figure 5B:
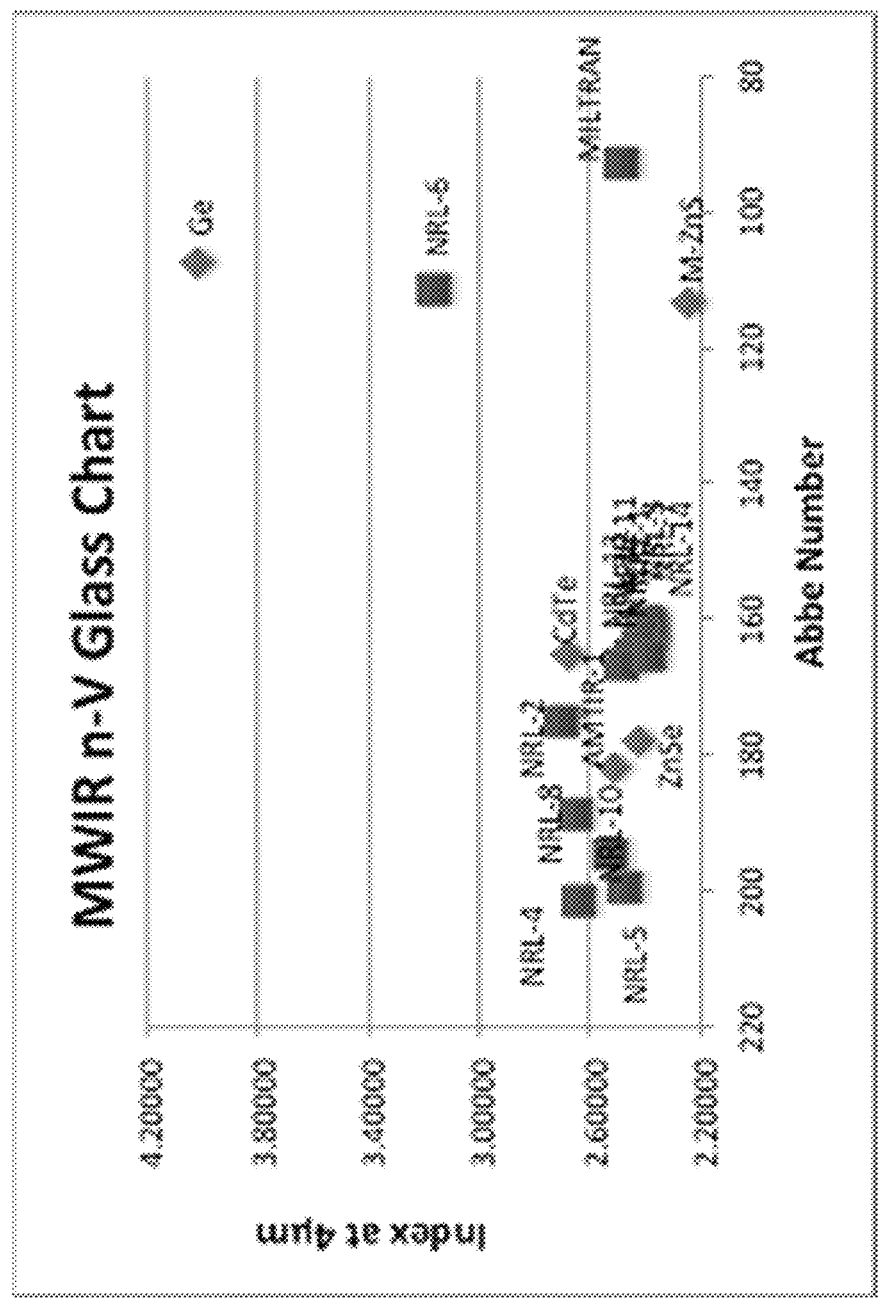
FIG. 5b is for an index at 4 μm.
Figure 5C:
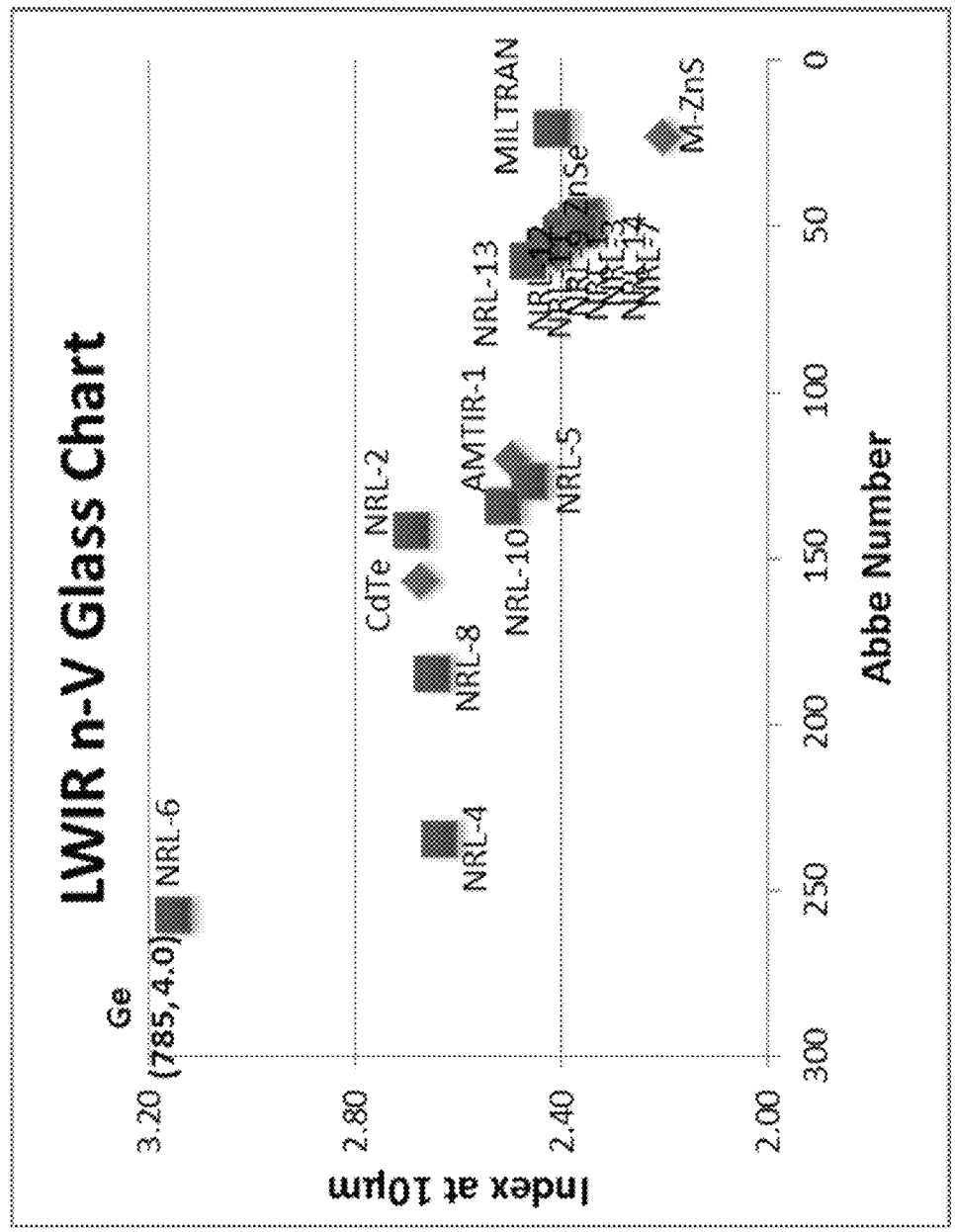
FIG. 5c is for an index at 10 μm.

The dispersion plots, as shown in FIG. 5, are often used as a guide when designing achromatic imagers. Without the new optical materials of this disclosure, the choices for multispectral optics are very limited and large gaps exist in the glass map. As it is evident from FIG. 5, the new materials of this disclosure populate the glass map giving more materials options. Looking at the dispersion plots, a few general observations can be made. Materials such as Ge and NRL-6 glass are least dispersive in the LWIR but are very dispersive in the MWIR. This implies that they cannot be used as a single lens element for a MWIR/LWIR dualband imager. Materials such as NRL-4 and NRL-8 are less dispersive in MWIR and LWIR bands but are dispersive in the SWIR region. Conversely MILTRAN and multispectral ZnS (m-ZnS) are very dispersive in the MWIR and LWIR bands, while they are less dispersive in the SWIR band. These offer some unique solutions when designing multispectral imagers. For example looking at MWIR and LWIR spectral bands for a dual-band imager, NRL-4 glass and MILTRAN would make a good pair for a crown/flint combination. They also have the largest separation in the Abbe number in the two wave bands, which minimizes serious curvature requirements on the optics, in turn minimizing the higher order aberrations and lowering fabrication costs.

Multispectral Optics Design

The materials of this disclosure provide advancements in optical design of multi-band systems. This is facilitated by the fact that the materials help fill in some of the gaps in the glass map, and do so while providing spectral transmission over larger portions of those bands. This is important particularly in the LWIR where some of the commonly used dual band materials such as $BaF_2$ and germanium start to lose transmission. The following two sets of optical designs are examples to show the advantages of using the materials of the present invention in dual-band imaging systems.

Example 1

TABLE 2

Room temperature dispersion data of the NRL multispectral refractive optical materials.

| Wavelength (μm) | Refractive Index | | | | | | | | | | | | | |
|---|---|---|---|---|---|---|---|---|---|---|---|---|---|---|
| | MILTRAN | NRL-1 | NRL-2 | NRL-3 | NRL-4 | NRL-5 | NRL-6 | NRL-7 | NRL-8 | NRL-9 | NRL-10 | NRL-11 | NRL-12 | NRL-13 |
| 1 | 2.55078 | 2.46444 | 2.82620 | 2.46711 | 2.75547 | 2.56019 | 3.53808 | 2.45056 | 2.77574 | 2.48531 | 2.61605 | 2.49869 | 2.53194 | 2.56817 |
| 2 | 2.50907 | 2.41377 | 2.72921 | 2.41403 | 2.66818 | 2.49375 | 3.22372 | 2.40111 | 2.68423 | 2.43256 | 2.54370 | 2.44479 | 2.47422 | 2.50674 |
| 3 | 2.49824 | 2.40389 | 2.71290 | 2.40383 | 2.65377 | 2.48219 | 3.18486 | 2.39135 | 2.66896 | 2.42222 | 2.53115 | 2.43432 | 2.46334 | 2.49522 |
| 4 | 2.49036 | 2.39908 | 2.70669 | 2.39893 | 2.64846 | 2.47759 | 3.17170 | 2.38655 | 2.66328 | 2.41728 | 2.52624 | 2.42937 | 2.45830 | 2.49002 |
| 5 | 2.48216 | 2.39528 | 2.70314 | 2.39511 | 2.64558 | 2.47478 | 3.16534 | 2.38273 | 2.66014 | 2.41348 | 2.52331 | 2.42559 | 2.45451 | 2.48626 |
| 6 | 2.47279 | 2.39148 | 2.70045 | 2.39131 | 2.64357 | 2.47251 | 3.16147 | 2.37890 | 2.65788 | 2.40974 | 2.52099 | 2.42189 | 2.45087 | 2.48272 |
| 7 | 2.46194 | 2.38728 | 2.69802 | 2.38713 | 2.64187 | 2.47033 | 3.15869 | 2.37465 | 2.65592 | 2.40565 | 2.51882 | 2.41786 | 2.44694 | 2.47895 |
| 8 | 2.44940 | 2.38249 | 2.69558 | 2.38237 | 2.64027 | 2.46806 | 3.15640 | 2.36979 | 2.65401 | 2.40099 | 2.51658 | 2.41327 | 2.44251 | 2.47474 |
| 9 | 2.43504 | 2.37693 | 2.69300 | 2.37685 | 2.63866 | 2.46561 | 3.15432 | 2.36416 | 2.65204 | 2.39560 | 2.51418 | 2.40797 | 2.43745 | 2.46992 |
| 10 | 2.41872 | 2.37046 | 2.69019 | 2.37041 | 2.63698 | 2.46290 | 3.15229 | 2.35760 | 2.64993 | 2.38933 | 2.51153 | 2.40181 | 2.43161 | 2.46437 |
| 11 | 2.40030 | 2.36291 | 2.68709 | 2.36289 | 2.63520 | 2.45989 | 3.15023 | 2.34994 | 2.64763 | 2.38200 | 2.50859 | 2.39461 | 2.42487 | 2.45795 |
| 12 | 2.37962 | 2.35407 | 2.68366 | 2.35407 | 2.63329 | 2.45652 | 3.14805 | 2.34096 | 2.64510 | 2.37341 | 2.50531 | 2.38618 | 2.41707 | 2.45050 |
| 13 | 2.35650 | 2.34368 | 2.67983 | 2.34369 | 2.63126 | 2.45277 | 3.14573 | 2.33041 | 2.64231 | 2.36329 | 2.50164 | 2.37625 | 2.40802 | 2.44183 |
| 14 | 2.33073 | 2.33140 | 2.67557 | 2.33138 | 2.62907 | 2.44857 | 3.14321 | 2.31794 | 2.63922 | 2.35131 | 2.49754 | 2.36449 | 2.39748 | 2.43170 |

Cooled IR Dual-Band (MWIR-LWIR) Imaging Lens Design

Figure 6:
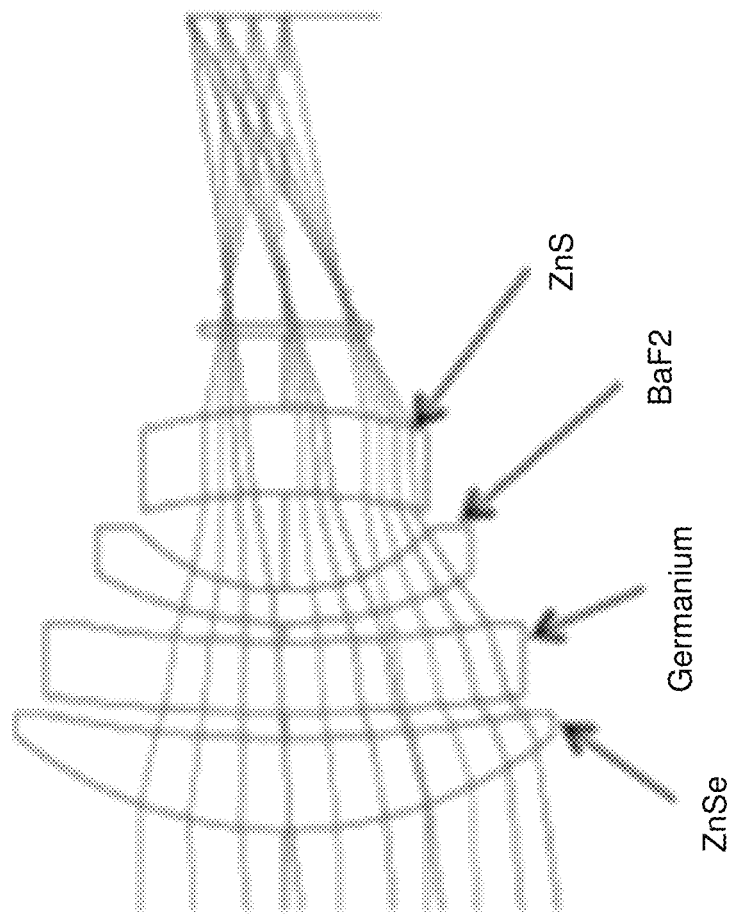
FIG. 6 shows an optics design using traditional crystal materials for a cooled MWIR/LWIR sensor (as per specs in Table 3).
Figure 7:
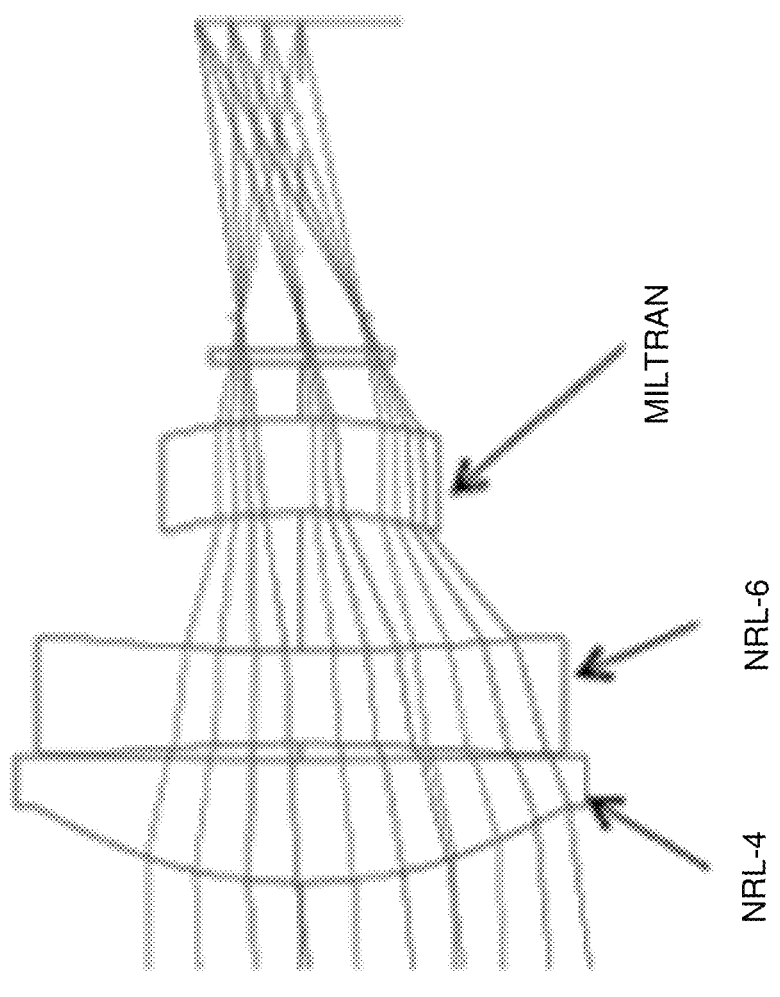
FIG. 7 shows an optics design using materials of the present invention for a cooled MWIR/LWIR sensor (as per specs in Table 3).

A generic cooled IR design is demonstrated utilizing both a traditional all-crystal design (FIG. 6) and comparing it to a design utilizing the materials of the present invention (FIG. 7). Both of these designs and the design in FIG. 8 utilize the same set of parameters described in Table 3. These relatively simple fixed focal length designs provide a useful comparison of the capabilities of the materials of the present invention. In this case, the MWIR spectrum is chosen to be 3.5-5.0 μm and the LWIR is 8.0-10.0 μm. These values are based on traditional spectral bands for cooled IR systems. All of the designs are also for a common focal length, f/number, and cold shield height of 1.0". The designs are evaluated as if they are being used with a 12 µm pixel pitch detector.

TABLE 3

First order imager specifications for the three cooled IR dual-band designs.
1$^{st}$ Order Optical Properties

| | |
|---|---|
| Focal Length | 66 mm |
| F/number | 2.5 |
| EPD (Entrance Pupil Diameter) | 26.4 mm |
| Wavelengths | 3.5-5.0, 8.0-10.0 µm |
| Image size | 17.6 mm |

The baseline all-crystal design, shown in FIG. 6, uses four different materials: ZnSe, germanium, BaF$_2$, and ZnS. This 4 lens design is optimized to be diffraction limited in both the MWIR and LWIR. An alternative three-lens design was developed, but could not meet the diffraction limited MTF for both bands.

A second design, shown in FIG. 7, was generated using the materials of the present invention. Originally a four-lens design was created, and its performance was perfectly diffraction limited. Further optimization enabled the elimination of one of the lenses, and still generated an equivalent performing design to that of the all-crystal design. The reduced number of lenses achieved using the materials of the present invention leads to savings in weight and cost.

Figure 8:
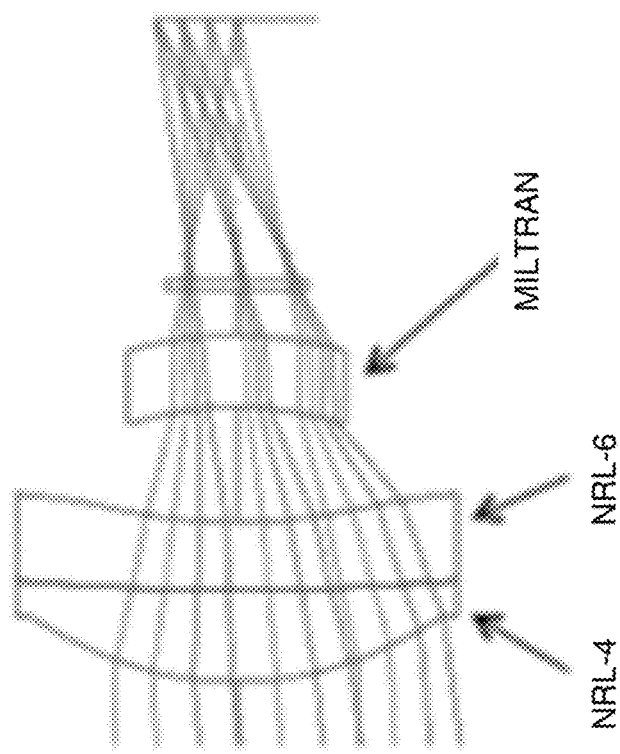
FIG. 8 shows an optics design using materials of the present invention with a bonded doublet configuration (NRL-4 and NRL-6) for a cooled MWIR/LWIR sensor (as per specs in Table 3).

Further improvement to the design is facilitated by a key characteristic of the NRL 1-13 materials of the present invention: the ability to form IR bonded doublets. This design results in two elements, an IR bonded doublet and a singlet as seen in FIG. 8. The performance is once again diffraction limited. The major benefit is in the simplification of alignment tolerances, particularly between lens one (the bonded doublet) and lens two (the singlet).

The benefit of the new materials of the present invention is in the reduction of elements for a general cooled IR dual band imager design. This benefit will translate to further reduction in complexity for more challenging reimaging and multi-FOV systems where color correction often requires more lenses.

Example 2

Uncooled IR Dual-Band (MWIR-LWIR) Imaging Lens Design

One way to further demonstrate the benefit of expanding the glass map is by designing an imaging system to more challenging performance. In this case, the design was focused on a dual band uncooled lens concept. This results in two changes that complicate the design, and one that simplifies it. The complication lies in going to a faster f/number and a broader spectral band. The faster f/number requires greater power from the lenses, which in general makes it harder to perform the required color correction. The broader spectral band is a result of the broadband nature of an uncooled FPA where the LWIR radiation can generally be observed out to 14 µm. The MWIR spectral band is assumed to be held the same, but the challenge of imaging the extra 4 µm (from 10.0-14.0 µm), is significant as it impacts the selection of materials and their choice for color correction. The lens is simplified by now allowing the aperture stop (no longer required to be inside a dewar) to float to any location within the optics train.

Three designs were created for comparison: a design using all traditional crystals, a design using the materials of the present invention, and an optics design using materials of the present invention and utilizing a bonded doublet configuration. The first order parameters are in Table 4.

TABLE 4

First order imager specifications for the three uncooled IR dual-band designs.
1$^{st}$ Order Optical Properties

| | |
|---|---|
| Focal Length | 68 mm |
| F/number | 1.2 |
| EPD (Entrance Pupil Diameter) | 26.4 mm |
| Wavelengths | 3.5-5.0, 8.0-14.0 µm |
| Image size | 17.6 mm |

Figure 9:
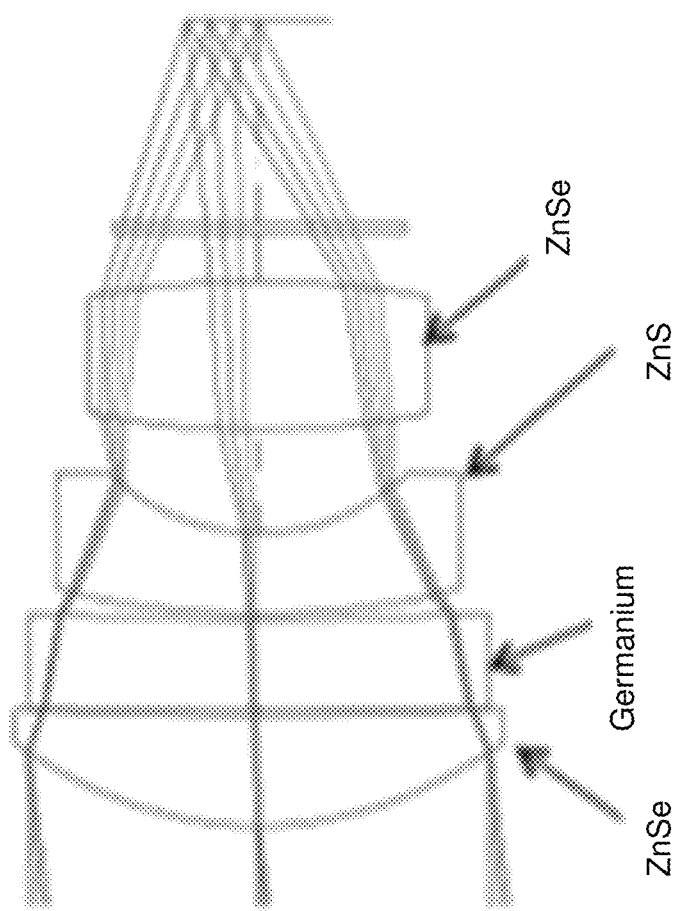
FIG. 9 shows an optics design using traditional crystal materials for an uncooled MWIR/LWIR sensor (as per specs in Table 4).

The design using all traditional crystals (FIG. 9), could not use BaF$_2$ due to its limited transmission in the LWIR. Also, germanium does not transmit well out past 13.0 µm, so even though it is desirable to operate out to 14.0 µm, the all-crystal design was limited to 13.0 µm at the long wavelength edge. The ray fan plot in FIG. 9 shows the spherical aberrations at different wavelengths as a function of the ray position on the optics. The rim rays (coming from the edge of the optics and shown at the edges of the ray fan plot) of FIG. 9 clearly show this design to be limited. Color correction from the longer wavelengths has resulted in degradation of MTF performance, particularly in the LWIR. The MWIR can maintain reasonable performance, but some off-axis degradation is still present.

Figure 10:
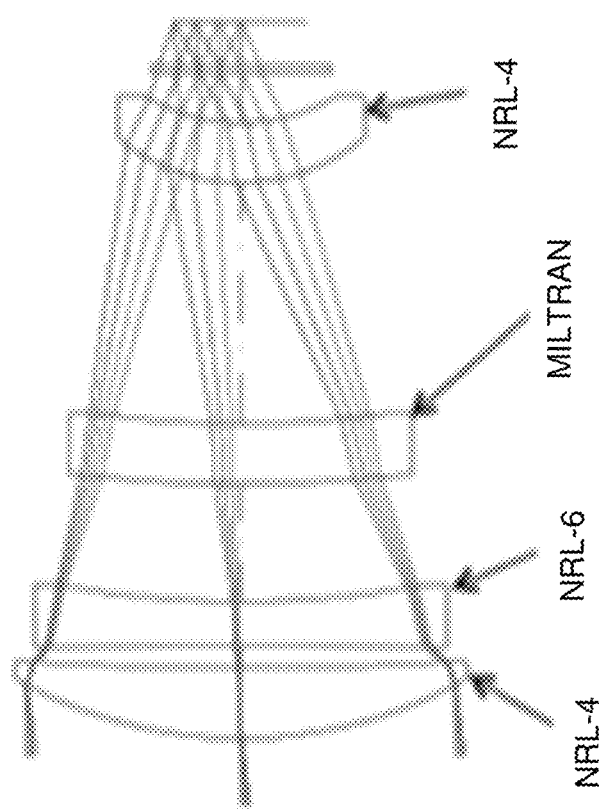
FIG. 10 shows an optics design using materials of the present invention for an uncooled MWIR/LWIR sensor (as per specs in Table 4).

The second design, which uses materials of the present invention and is shown in FIG. 10, is not limited to a long wavelength cutoff of 13.0 µm, as all materials that were selected transmit out to 14.0 µm. Thus, this lens was designed for a wavelength range of 3.5-14 µm to demonstrate the capabilities of the materials of the present invention. The same materials were used as before in the cooled IR case (example 1) with the narrower wavelength set. In this case, four lenses were required to achieve diffraction limited performance.

Figure 11:
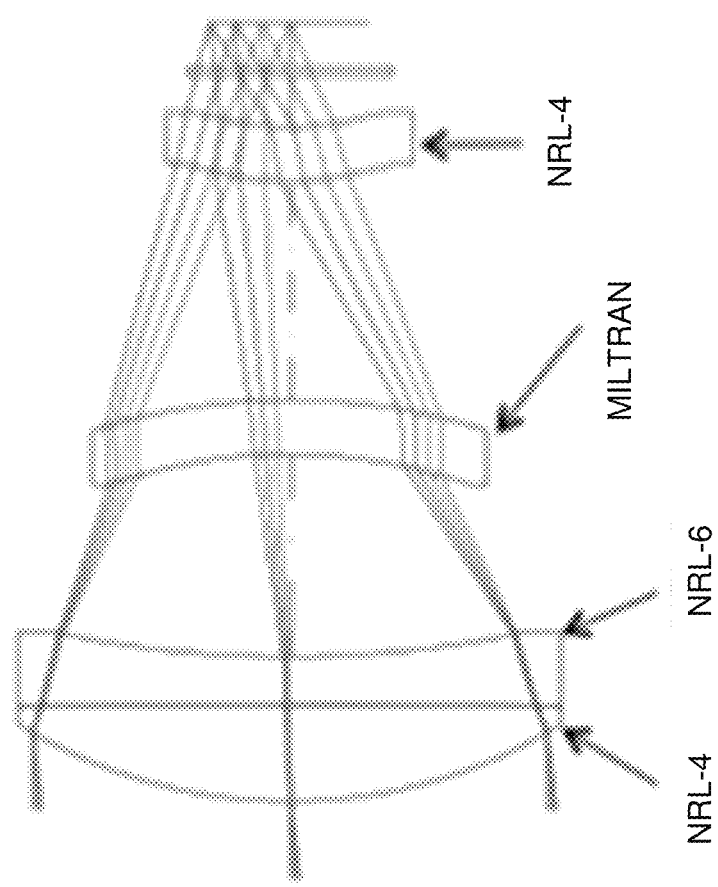
FIG. 11 shows an optics design using materials of the present invention with a bonded doublet configuration for an uncooled MWIR/LWIR sensor (as per specs in Table 4).

The design was modified to use a formed doublet versus the air-spaced doublet (FIG. 11). The result is a similar design, but a reduced number of elements that need aligning, and the elimination of the steep ray angles between lenses 1 and 2. This has a large impact on tolerances, as generally lenses that have large angles of incidence are very susceptible to alignment errors. This was verified in a tolerance analysis. The delta was significant, particularly off-axis.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A compact multispectral imaging system, comprising:
   two or more refractive optical elements, wherein the optical elements can simultaneously focus light from shortwave infrared (SWIR) spectral bands, midwave infrared (MWIR) spectral bands, longwave (LWIR) infrared spectral bands, or any combination thereof to a common focal plane, wherein at least one optical element comprises an optical material as defined by one of the following descriptions:

a polycrystalline ceramic material comprising a Group 2 element, a lanthanide, and sulfur, and having greater than 65% transmission in SWIR, MWIR and LWIR wavelength regions, a refractive index of about 2.49 at a wavelength of 3 μm, a SWIR Abbe number ($V_{SWIR}$) of about 31, a MWIR Abbe number ($V_{MWIR}$) of about 93, a LWIR Abbe number ($V_{LWIR}$) of about 20, and a coefficient of thermal expansion (CTE) of about $15 \times 10^{-6}/°$ C.;

an optical glass material comprising arsenic and sulfur and having transmission in SWIR, MWIR and LWIR wavelength regions with a −3 dB electronic edge at about 0.56 μm and a −3 dB multiphonon edge at about 12.7 μm, a refractive index of about 2.40 at a wavelength of 3 μm, a $V_{SWIR}$ of about 23, a $V_{MWIR}$ of about 162, a $V_{LWIR}$ of about 48, a thermo-optic coefficient (dn/dT) of about $-17 \times 10^{-6}/°$ C. at a wavelength of 3 μm, a glass transition temperature ($T_g$) of about 195° C., a viscosity of about $10^{8.4}$ Pa·S at 240° C., and a coefficient of thermal expansion (CTE) of about $26.6 \times 10^{-6}/°$ C.;

an optical glass material comprising Ge, As, and Se and having transmission in SWIR, MWIR and LWIR wavelength regions with a −3 dB electronic edge at about 0.79 μm and a −3 dB multiphonon edge at about 18.2 μm, a refractive index of about 2.71 at a wavelength of 3 μm, a $V_{SWIR}$ of about 15, a $V_{MWIR}$ of about 175, a $V_{LWIR}$ of about 142, a thermo-optic coefficient (dn/dT) of about $39 \times 10^{-6}/°$ C. at a wavelength of 3 μm, a glass transition temperature ($T_g$) of about 196° C., a viscosity of about $10^{8.7}$ Pa·S at 240° C., and a coefficient of thermal expansion (CTE) of about $23.2 \times 10^{-6}/°$ C.;

an optical glass material comprising Ge, As, S, and Te and having transmission in SWIR, MWIR and LWIR wavelength regions with a −3 dB electronic edge at about 0.89 μm and a −3 dB multiphonon edge at about 12.5 μm, a refractive index of about 2.40 at a wavelength of 3 μm, a $V_{SWIR}$ of about 22, a $V_{MWIR}$ of about 160, a $V_{LWIR}$ of about 48, a thermo-optic coefficient (dn/dT) of about $-5.9 \times 10^{-6}/°$ C. at a wavelength of 3 μm, a glass transition temperature ($T_g$) of about 196° C., a viscosity of about $10^{8.8}$ Pa·S at 240° C., and a coefficient of thermal expansion (CTE) of about $25.6 \times 10^{-6}/°$ C.;

an optical glass material comprising Ge, As, and Se and having transmission in SWIR, MWIR and LWIR wavelength regions with a −3 dB electronic edge at about 0.78 μm and a −3 dB multiphonon edge at about 17.5 μm, a refractive index of about 2.65 at a wavelength of 3 μm, a $V_{SWIR}$ of about 16, a $V_{MWIR}$ of about 201, a $V_{LWIR}$ of about 235, a thermo-optic coefficient (dn/dT) of about $-18.4 \times 10^{-6}/°$ C. at a wavelength of 3 μm, a glass transition temperature ($T_g$) of about 201° C., a viscosity of about $10^{10.1}$ Pa·S at 240° C., and a coefficient of thermal expansion (CTE) of about $30.2 \times 10^{-6}/°$ C.;

an optical glass material comprising Ge, As, and Se and having transmission in SWIR, MWIR and LWIR wavelength regions with a −3 dB electronic edge at about 0.74 μm and a −3 dB multiphonon edge at about 17.2 μm, a refractive index of about 2.48 at a wavelength of 3 μm, a $V_{SWIR}$ of about 19, a $V_{MWIR}$ of about 200, a $V_{LWIR}$ of about 127, a thermo-optic coefficient (dn/dT) of about $8.3 \times 10^{-6}/°$ C. at a wavelength of 3 μm, a glass transition temperature ($T_g$) of about 192, a viscosity of about $10^{9.7}$ Pa·S at 240° C., and a coefficient of thermal expansion (CTE) of about $26 \times 10^{-6}/°$ C.;

an optical glass material comprising Ge, As, Se, and Te and having transmission in MWIR and LWIR wavelength regions with a −3 dB electronic edge at about 1.43 μm and a −3 dB multiphonon edge at about 18.2 μm, a refractive index of about 3.18 at a wavelength of 3 μm, a $V_{MWIR}$ of about 111, a $V_{LWIR}$ of about 258, a thermo-optic coefficient (dn/dT) of about $177 \times 10^{-6}/°$ C. at a wavelength of 3 μm, a glass transition temperature ($T_g$) of about 191, a viscosity of about $10^{8.7}$ Pa·S at 240° C., and a coefficient of thermal expansion (CTE) of about $18.3 \times 10^{-6}/°$ C.;

an optical glass material comprising Ge, As, and S and having transmission in SWIR, MWIR and LWIR wavelength regions with a −3 dB electronic edge at about 0.57 μm and a −3 dB multiphonon edge at about 12.7 μm, a refractive index of about 2.39 at a wavelength of 3 μm, a $V_{SWIR}$ of about 24, a $V_{MWIR}$ of about 161, a $V_{LWIR}$ of about 47, a thermo-optic coefficient (dn/dT) of about $-6.1 \times 10^{-6}/°$ C. at a wavelength of 3 μm, a glass transition temperature ($T_g$) of about 201, a viscosity of about $10^{8.7}$ Pa·S at 240° C., and a coefficient of thermal expansion (CTE) of about $25.3 \times 10^{-6}/°$ C.;

an optical glass material comprising Ge, As, and Se and having transmission in SWIR, MWIR and LWIR wavelength regions with a −3 dB electronic edge at about 0.79 μm and a −3 dB multiphonon edge at about 18.9 μm, a refractive index of about 2.67 at a wavelength of 3 μm, a $V_{SWIR}$ of about 15, a $V_{MWIR}$ of about 189, a $V_{LWIR}$ of about 185, a thermo-optic coefficient (dn/dT) of about $1.5 \times 10^{-6}/°$ C. at a wavelength of 3 μm, a glass transition temperature ($T_g$) of about 193, a viscosity of about $10^{8.8}$ Pa·S at 240° C., and a coefficient of thermal expansion (CTE) of about $25.7 \times 10^{-6}/°$ C.;

an optical glass material comprising Ge, As, S, and Se and having transmission in SWIR, MWIR and LWIR wavelength regions with a −3 dB electronic edge at about 0.61 μm and a −3 dB multiphonon edge at about 12.8 μm, a refractive index of about 2.42 at a wavelength of 3 μm, a $V_{SWIR}$ of about 23, a $V_{MWIR}$ of about 162, a $V_{LWIR}$ of about 50, a thermo-optic coefficient (dn/dT) of about $-3.9 \times 10^{-6}/°$ C. at a wavelength of 3 μm, a glass transition temperature ($T_g$) of about 197, a viscosity of about $10^{8.6}$ Pa·S at 240° C., and a coefficient of thermal expansion (CTE) of about $25.1 \times 10^{-6}/°$ C.;

an optical glass material comprising Ge, As, and Se and having transmission in SWIR, MWIR and LWIR wavelength regions with a −3 dB electronic edge at about 0.74 μm and a −3 dB multiphonon edge at about 17.5 μm, a refractive index of about 2.53 at a wavelength of 3 μm, a $V_{SWIR}$ of about 18, a $V_{MWIR}$ of about 195, a $V_{LWIR}$ of about 134, a thermo-optic coefficient (dn/dT) of about $23.5 \times 10^{-6}/°$ C. at a wavelength of 3 μm, a glass transition temperature ($T_g$) of about 191, a viscosity of about $10^{8.9}$ Pa·S at 240° C., and a coefficient of thermal expansion (CTE) of about $27 \times 10^{-6}/°$ C.;

an optical glass material comprising As, S, and Se and having transmission in SWIR, MWIR and LWIR wavelength regions with a −3 dB electronic edge at about 0.62 μm and a −3 dB multiphonon edge at about 12.9 μm, a refractive index of about 2.43 at a wavelength of 3 µm, a $V_{SWIR}$ of about 23, a $V_{MWIR}$ of about 164, a $W_{LWIR}$ of about 52, a thermo-optic coefficient (dn/dT) of about $-0.3 \times 10^{-6}$/° C. at a wavelength of 3 µm, a glass transition temperature ($T_g$) of about 196, a viscosity of about $10^{8.2}$ Pa·S at 240° C., and a coefficient of thermal expansion (CTE) of about $25.5 \times 10^{-6}$/° C.;

an optical glass material comprising As, S, and Se and having transmission in SWIR, MWIR and LWIR wavelength regions with a −3 dB electronic edge at about 0.64 µm and a −3 dB multiphonon edge at about 13 µm, a refractive index of about 2.46 at a wavelength of 3 µm, a $V_{SWIR}$ of about 21, a $V_{MWIR}$ of about 165, a $V_{LWIR}$ of about 56, a thermo-optic coefficient (dn/dT) of about $0.8 \times 10^{-6}$/° C. at a wavelength of 3 µm, a glass transition temperature ($T_g$) of about 193, a viscosity of about $10^{8.1}$ Pa·S at 240° C., and a coefficient of thermal expansion (CTE) of about $25.9 \times 10^{-6}$/° C.;

an optical glass material comprising As, S, and Se and having transmission in SWIR, MWIR and LWIR wavelength regions with a −3 dB electronic edge at about 0.66 µm and a −3 dB multiphonon edge at about 13 µm, a refractive index of about 2.49 at a wavelength of 3 µm, a $V_{SWIR}$ of about 21, a $V_{MWIR}$ of about 166, a $V_{LWIR}$ of about 60; a thermo-optic coefficient (dn/dT) of about $1.9 \times 10^{-6}$/° C. at a wavelength of 3 µm, a glass transition temperature ($T_g$) of about 192, a viscosity of about $10^{7.9}$ Pa·S at 240° C., and a coefficient of thermal expansion (CTE) of about $25.2 \times 10^{-6}$/° C.;

a focal plane array detector; and an imaging processing unit that processes signals from the focal plane array detector.

2. The system of claim 1, wherein all optical elements comprises an optical material as defined by one of the following descriptions.

a polycrystalline ceramic material comprising a Group 2 element, a lanthanide, and sulfur, and having greater than 65% transmission in SWIR, MWIR and LWIR wavelength regions, a refractive index of about 2.49 at a wavelength of 3 µm, a SWIR Abbe number ($V_{SWIR}$) of about 31, a MWIR Abbe number ($V_{MWIR}$) of about 93, a LWIR Abbe number ($W_{LWIR}$) of about 20, and a coefficient of thermal expansion (CTE) of about $15 \times 10^{-6}$/° C.;

an optical glass material comprising arsenic and sulfur and having transmission in SWIR, MWIR and LWIR wavelength regions with a −3 dB electronic edge at about 0.56 µm and a −3 dB multiphonon edge at about 12.7 µm, a refractive index of about 2.40 at a wavelength of 3 µm, a $V_{SWIR}$ of about 23, a $V_{MWIR}$ of about 162, a $V_{LWIR}$ of about 48, a thermo-optic coefficient (dn/dT) of about $-17 \times 10^{-6}$/° C. at a wavelength of 3 µm, a glass transition temperature ($T_g$) of about 195° C., a viscosity of about $10^{8.4}$ Pa·S at 240° C., and a coefficient of thermal expansion (CTE) of about $26.6 \times 10^{-6}$/° C.;

an optical glass material comprising Ge, As, and Se and having transmission in SWIR, MWIR and LWIR wavelength regions with a −3 dB electronic edge at about 0.79 µm and a −3 dB multiphonon edge at about 18.2 µm, a refractive index of about 2.71 at a wavelength of 3 µm, a $V_{SWIR}$ of about 15, a $V_{MWIR}$ of about 175, a $V_{LWIR}$ of about 142, a thermo-optic coefficient (dn/dT) of about $39 \times 10^{-6}$/° C. at a wavelength of 3 µm, a glass transition temperature ($T_g$) of about 196° C., a viscosity of about $10^{8.7}$ Pa·S at 240° C., and a coefficient of thermal expansion (CTE) of about $23.2 \times 10^{-6}$/° C.;

an optical glass material comprising Ge, As, S, and Te and having transmission in SWIR, MWIR and LWIR wavelength regions with a −3 dB electronic edge at about 0.89 µm and a −3 dB multiphonon edge at about 12.5 µm, a refractive index of about 2.40 at a wavelength of 3 µm, a $V_{SWIR}$ of about 22, a $V_{MWIR}$ of about 160, a $V_{LWIR}$ of about 48, a thermo-optic coefficient (dn/dT) of about $-5.9 \times 10^{-6}$/° C. at a wavelength of 3 µm, a glass transition temperature ($T_g$) of about 196° C., a viscosity of about $10^{8.8}$ Pa·S at 240° C., and a coefficient of thermal expansion (CTE) of about $25.6 \times 10^{-6}$/° C.;

an optical glass material comprising Ge, As, and Se and having transmission in SWIR, MWIR and LWIR wavelength regions with a −3 dB electronic edge at about 0.78 µm and a −3 dB multiphonon edge at about 17.5 µm, a refractive index of about 2.65 at a wavelength of 3 µm, a $V_{SWIR}$ of about 16, a $V_{MWIR}$ of about 201, a $V_{LWIR}$ of about 235, a thermo-optic coefficient (dn/dT) of about $-18.4 \times 10^{-6}$/° C. at a wavelength of 3 µm, a glass transition temperature ($T_g$) of about 201, a viscosity of about $10^{10.1}$ Pa·S at 240° C., and a coefficient of thermal expansion (CTE) of about $30.2 \times 10^{-6}$/° C.;

an optical glass material comprising Ge, As, and Se and having transmission in SWIR, MWIR and LWIR wavelength regions with a −3 dB electronic edge at about 0.74 µm and a −3 dB multiphonon edge at about 17.2 µm, a refractive index of about 2.48 at a wavelength of 3 µm, a $V_{SWIR}$ of about 19, a $V_{MWIR}$ of about 200, a $V_{LWIR}$ of about 127, a thermo-optic coefficient (dn/dT) of about $8.3 \times 10^{-6}$/° C. at a wavelength of 3 µm, a glass transition temperature ($T_g$) of about 192, a viscosity of about $10^{9.7}$ Pa·S at 240° C., and a coefficient of thermal expansion (CTE) of about $26 \times 10^{-6}$/° C.;

an optical glass material comprising Ge, As, Se, and Te and having transmission in MWIR and LWIR wavelength regions with a −3 dB electronic edge at about 1.43 µm and a −3 dB multiphonon edge at about 18.2 µm, a refractive index of about 3.18 at a wavelength of 3 µm, a $V_{MWIR}$ of about 111, a $V_{LWIR}$ of about 258, a thermo-optic coefficient (dn/dT) of about $177 \times 10^{-6}$/° C. at a wavelength of 3 µm, a glass transition temperature ($T_g$) of about 191, a viscosity of about $10^{8.7}$ Pa·S at 240° C., and a coefficient of thermal expansion (CTE) of about $18.3 \times 10^{-6}$/° C.;

an optical glass material comprising Ge, As, and S and having transmission in SWIR, MWIR and LWIR wavelength regions with a −3 dB electronic edge at about 0.57 µm and a −3 dB multiphonon edge at about 12.7 µm, a refractive index of about 2.39 at a wavelength of 3 µm, a $V_{SWIR}$ of about 24, a $V_{MWIR}$ of about 161, a $V_{LWIR}$ of about 47, a thermo-optic coefficient (dn/dT) of about $-6.1 \times 10^{-6}$/° C. at a wavelength of 3 µm, a glass transition temperature ($T_g$) of about 201, a viscosity of about $10^{8.7}$ Pa·S at 240° C., and a coefficient of thermal expansion (CTE) of about $25.3 \times 10^{-6}$/° C.;

an optical glass material comprising Ge, As, and Se and having transmission in SWIR, MWIR and LWIR wavelength regions with a −3 dB electronic edge at about 0.79 µm and a −3 dB multiphonon edge at about 18.9 µm, a refractive index of about 2.67 at a wavelength of 3 µm, a $V_{SWIR}$ of about 15, a $V_{MWIR}$ of about 189, a $V_{LWIR}$ of about 185, a thermo-optic coefficient (dn/dT) of about $1.5 \times 10^{-6}$/° C. at a wavelength of 3 µm, a glass transition temperature ($T_g$) of about 193, a viscosity of about $10^{8.8}$ Pa·S at 240° C., and a coefficient of thermal expansion (CTE) of about $25.7\times10^{-6}/°$ C.;

an optical glass material comprising Ge, As, S, and Se and having transmission in SWIR, MWIR and LWIR wavelength regions with a −3 dB electronic edge at about 0.61 μm and a −3 dB multiphonon edge at about 12.8 μm, a refractive index of about 2.42 at a wavelength of 3 μm, a $V_{SWIR}$ of about 23, a $V_{MWIR}$ of about 162, a $V_{LWIR}$ of about 50, a thermo-optic coefficient (dn/dT) of about $-3.9\times10^{-6}/°$ C. at a wavelength of 3 μm, a glass transition temperature ($T_g$) of about 197, a viscosity of about $10^{8.6}$ Pa·S at 240° C., and a coefficient of thermal expansion (CTE) of about $25.1\times10^{-6}/°$ C.;

an optical glass material comprising Ge, As, and Se and having transmission in SWIR, MWIR and LWIR wavelength regions with a −3 dB electronic edge at about 0.74 μm and a −3 dB multiphonon edge at about 17.5 μm, a refractive index of about 2.53 at a wavelength of 3 μm, a $V_{SWIR}$ of about 18, a $V_{MWIR}$ of about 195, a $V_{LWIR}$ of about 134, a thermo-optic coefficient (dn/dT) of about $23.5\times10^{-6}/°$ C. at a wavelength of 3 μm, a glass transition temperature ($T_g$) of about 191, a viscosity of about $10^{8.9}$ Pa·S at 240° C., and a coefficient of thermal expansion (CTE) of about $27\times10^{-6}/°$ C.;

an optical glass material comprising As, S, and Se and having transmission in SWIR, MWIR and LWIR wavelength regions with a −3 dB electronic edge at about 0.62 μm and a −3 dB multiphonon edge at about 12.9 μm, a refractive index of about 2.43 at a wavelength of 3 μm, a $V_{SWIR}$ of about 23, a $V_{MWIR}$ of about 164, a $W_{LWIR}$ of about 52, a thermo-optic coefficient (dn/dT) of about $-0.3\times10^{-6}/°$ C. at a wavelength of 3 μm, a glass transition temperature ($T_g$) of about 196, a viscosity of about $10^{8.2}$ Pa·S at 240° C., and a coefficient of thermal expansion (CTE) of about $25.5\times10^{6}/°$ C.;

an optical glass material comprising As, S, and Se and having transmission in SWIR, MWIR and LWIR wavelength regions with a −3 dB electronic edge at about 0.64 μm and a −3 dB multiphonon edge at about 13 μm, a refractive index of about 2.46 at a wavelength of 3 μm, a $V_{SWIR}$ of about 21, a $V_{MWIR}$ of about 165, a $W_{LWIR}$ of about 56, a thermo-optic coefficient (dn/dT) of about $0.8\times10^{-6}/°$ C. at a wavelength of 3 μm, a glass transition temperature ($T_g$) of about 193, a viscosity of about $10^{8.1}$ Pa·S at 240° C., and a coefficient of thermal expansion (CTE) of about $25.9\times10^{-6}/°$ C.;

an optical glass material comprising As, S, and Se and having transmission in SWIR, MWIR and LWIR wavelength regions with a −3 dB electronic edge at about 0.66 μm and a −3 dB multiphonon edge at about 13 μm, a refractive index of about 2.49 at a wavelength of 3 μm, a $V_{SWIR}$ of about 21, a $V_{MWIR}$ of about 166, a $V_{LWIR}$ of about 60; a thermo-optic coefficient (dn/dT) of about $1.9\times10^{-6}/°$ C. at a wavelength of 3 μm, a glass transition temperature ($T_g$) of about 192, a viscosity of about $10^{7.9}$ Pa·S at 240° C., and a coefficient of thermal expansion (CTE) of about $25.2\times10^{-6}/°$ C.

\* \* \* \* \*